United States Patent
Yoon et al.

(10) Patent No.: US 11,362,789 B2
(45) Date of Patent: Jun. 14, 2022

(54) METHOD FOR TRANSMITTING AND RECEIVING REFERENCE SIGNAL IN UNLICENSED BAND, AND DEVICE THEREFOR

(71) Applicant: LG ELECTRONICS INC., Seoul (KR)

(72) Inventors: Sukhyon Yoon, Seoul (KR); Hyunsoo Ko, Seoul (KR); Kijun Kim, Seoul (KR); Seonwook Kim, Seoul (KR); Changhwan Park, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 16/965,596

(22) PCT Filed: Feb. 12, 2019

(86) PCT No.: PCT/KR2019/001665
§ 371 (c)(1),
(2) Date: Jul. 28, 2020

(87) PCT Pub. No.: WO2019/160292
PCT Pub. Date: Aug. 22, 2019

(65) Prior Publication Data
US 2021/0044401 A1    Feb. 11, 2021

Related U.S. Application Data

(60) Provisional application No. 62/630,255, filed on Feb. 14, 2018.

(51) Int. Cl.
*H04L 5/00*     (2006.01)
*H04W 72/04*    (2009.01)

(52) U.S. Cl.
CPC ......... *H04L 5/0048* (2013.01); *H04W 72/042* (2013.01)

(58) Field of Classification Search
CPC .......................... H04L 5/0048; H04W 72/042
See application file for complete search history.

(56) References Cited

U.S. PATENT DOCUMENTS

2015/0043520 A1* 2/2015 Sun .................... H04L 5/005
2015/0103800 A1  4/2015 Seo et al.
(Continued)

FOREIGN PATENT DOCUMENTS

WO    2017023043    2/2017

OTHER PUBLICATIONS

PCT International Application No. PCT/KR2019/001665, International Search Report and Written Opinion dated May 21, 2019, 18 pages.

(Continued)

*Primary Examiner* — Ronald B Abelson
(74) *Attorney, Agent, or Firm* — Lee, Hong, Degerman, Kang & Waimey PC

(57) ABSTRACT

Disclosed is a method by which a terminal receives a tracking reference signal (TRS) in an unlicensed band. Particularly, the method receives a common physical downlink control channel (PDCCH) including first information related to the TRS transmission, and receives the TRS on the basis of the first information, wherein the first information can include information on whether TRS is transmitted and/or on a TRS transmission format.

9 Claims, 22 Drawing Sheets

(56) References Cited

U.S. PATENT DOCUMENTS

2016/0149672 A1* 5/2016 Shimezawa ............ H04L 1/1607
2019/0364557 A1* 11/2019 Harada ................. H04W 28/04
2020/0136767 A1* 4/2020 Ernstrom ................ H04L 5/005
2020/0205116 A1* 6/2020 Zhang ............... H04W 72/0446

OTHER PUBLICATIONS

Qualcomm Incorporated, "Contents of group common PDCCH," 3GPP TSG RAN WG1 Meeting #90, R1-1713423, Prague, Czech Republic, Aug. 21-25, 2017, 9 pages.
Ericsson, "Remaining details on Trs," 3GPP TSG-RAN WG1 Meeting 90bis, R1-1718451, Prague, CZ, Oct. 9-13, 2017, 27 pages.
Nokia et al., "On the remaining aspects of group-common PDCCH in NR," 3GPP TSG-RAN WG1 RAN1#91, R1-1720508, Reno, Nevada, Nov. 27-Dec. 1, 2017, 6 pages.

* cited by examiner (A) CONTROL-PLANE PROTOCOL STACK (B) USER-PLANE PROTOCOL STACK

FIG. 21

| slot index | 1st slot | | | | | | | | | | | | | | 2nd slot | | | | | | | | | | | | | |
|---|---|---|---|---|---|---|---|---|---|---|---|---|---|---|---|---|---|---|---|---|---|---|---|---|---|---|---|---|
| Symbol index | 1 | 2 | 3 | 4 | 5 | 6 | 7 | 8 | 9 | 10 | 11 | 12 | 13 | 14 | 1 | 2 | 3 | 4 | 5 | 6 | 7 | 8 | 9 | 10 | 11 | 12 | 13 | 14 |
| Ex. 1 | T/C | T/C | S | S | S | S | S | T/S | T/C | S | S | S | S | S | C | C | S | S | S | S | S | S | S | S | S | S | S | S |
| Ex. 2 | T/C | T/C | S | S | S | S | T/S | S | S | S | S | S | S | T/S | C | C | S | S | S | S | S | S | S | S | S | S | S | S |
| Ex. 3 | T/C | T/C | S | S | S | S | S | S | S | S | S | S | S | S | T/C | T/C | S | S | S | S | S | S | S | S | S | S | S | S |
| Ex. 4 | T/C | T/C | S | S | S | S | S | S | S | S | S | S | S | S | T/C | S | S | S | S | S | S | T/C | S | S | S | S | S | S |
| Ex. 5 | C | C | T | T | S | S | S | T/S | T/C | S | S | S | S | S | C | C | S | S | S | S | S | S | S | S | S | S | S | S |

METHOD FOR TRANSMITTING AND RECEIVING REFERENCE SIGNAL IN UNLICENSED BAND, AND DEVICE THEREFOR

CROSS-REFERENCE TO RELATED APPLICATIONS

This application is the National Stage filing under 35 U.S.C. 371 of International Application No. PCT/KR2019/001665, filed on Feb. 12, 2019, which claims the benefit of U.S. Provisional Application No. 62/630,255, filed on Feb. 14, 2018, the contents of which are all hereby incorporated by reference herein in their entirety.

TECHNICAL FIELD

The present disclosure relates to a method and apparatus for transmitting and receiving a reference signal (RS) in an unlicensed band, and more particularly, to a method and apparatus for, when a base station (BS) transmits information related to transmission of a tracking reference signal (TRS) in an unlicensed band to a user equipment (UE), receiving the TRS in the unlicensed band based on the received information by the UE.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure is to provide a method and apparatus for transmitting and receiving a reference signal (RS) in an unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of receiving a tracking reference signal (TRS) in an unlicensed band by a user equipment (UE) includes receiving a common physical downlink control channel (PDCCH) including first information related to transmission of the TRS, and receiving the TRS based on the first information. The first information may include at least one of information about transmission or non-transmission of the TRS or information about a transmission format of the TRS.

The common PDCCH may be transmitted together with a downlink transmission burst.

Further, the transmission format of the TRS may relate to a slot and a symbol carrying the TRS.

Further, when the TRS is transmitted in a first symbol of a downlink transmission burst, the TRS may be used as a demodulation reference signal (DMRS) for a PDCCH.

Further, the first information may include information related to whether a signal other than the TRS is mapped in a slot carrying the TRS.

Further, the method may further include receiving a downlink scheduling PDCCH including at least one of second information about a beam carrying the TRS or third information about a downlink signal assumable to be quasi-collocated with the TRS.

Further, a sequence of the TRS may be based on at least of a cell identifier (ID), a beam ID, or a UE ID.

Further, the TRS may be mapped to two consecutive symbols.

Further, the two consecutive symbols may be first and second symbols of a slot carrying the TRS.

Further, the common PDCCH may be a group-common PDCCH.

According to the present disclosure, a communication device for receiving a TRS in an unlicensed band includes a memory and a processor coupled to the memory. The processor is configured to control reception of a common PDCCH including information related to transmission of the TRS, and reception of the TRS based on the information related to transmission of the TRS. The information related to transmission of the TRS may include at least one of information about transmission or non-transmission of the TRS or information about a transmission format of the TRS.

According to the present disclosure, a method of transmitting a TRS in an unlicensed band by a BS includes transmitting a common PDCCH including information related to transmission of the TRS, and transmitting the TRS based on the information related to transmission of the TRS. The information related to transmission of the TRS may include at least one of information about transmission or non-transmission of the TRS or information about a transmission format of the TRS.

Advantageous Effects

According to the present disclosure, a tracking reference signal (TRS) may be transmitted and received efficiently even in an unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 21 is a diagram illustrating transmission formats of a TRS used as an initialization signal according to an embodiment of the present disclosure.

BEST MODE

Figure 1:
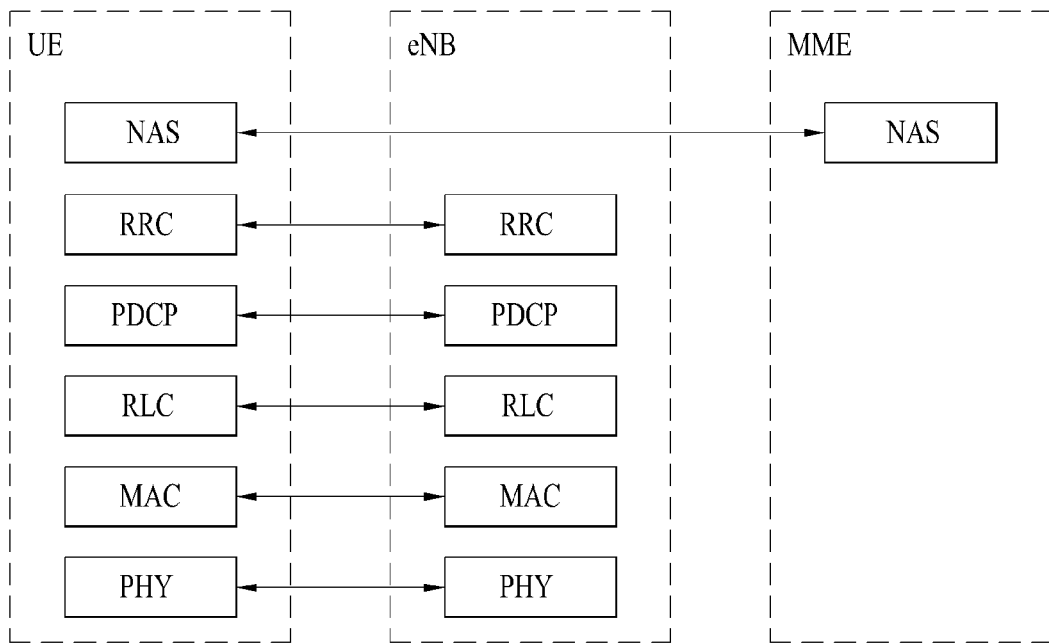
FIG. 1 is a diagram for structures of control and user planes of radio interface protocol between a 3GPP radio access network standard-based user equipment and E-UTRAN.
Figure 1:
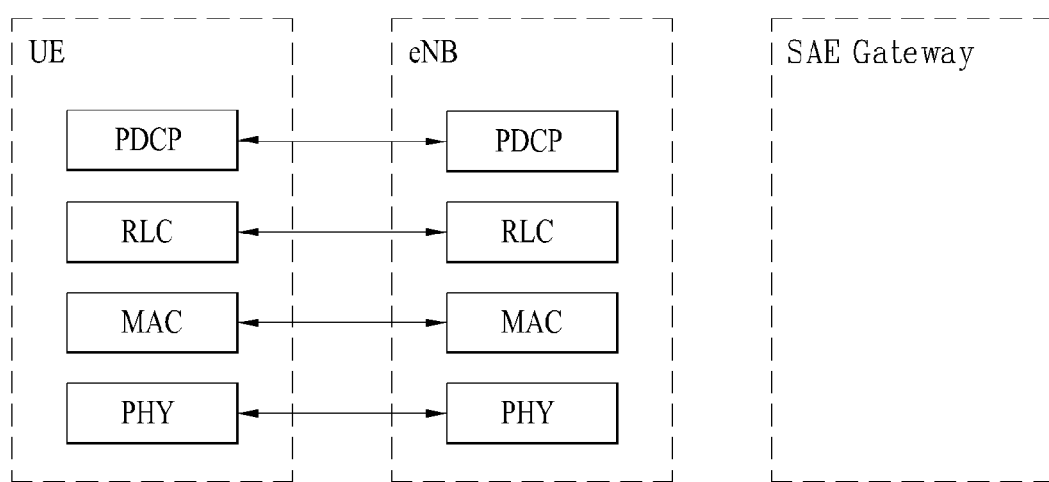

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE), LTE-Advanced (LTE-A), and New Radio (NR) systems, they are purely exemplary. Therefore, the embodiments of the present disclosure are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

3GPP-based communication standards defines downlink physical channels corresponding to resource elements carrying information derived from a higher layer and downlink physical signals corresponding to resource elements which are used by a physical layer and do not carry the information derived from the higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid automatic repeat request indicator channel (PHICH) are defined as the downlink physical channels, and a reference signal and a synchronization signal are defined as the downlink physical signals. A reference signal (RS), also called a pilot signal, refers to a predefined signal with a specific waveform known to both a gNB and a user equipment (UE). For example, a cell-specific RS (CRS), a UE-specific RS (UE-RS), a positioning RS (PRS), and a channel state information RS (CSI-RS) may be defined as downlink RSs. In addition, the 3GPP LTE/LTE-A standards define uplink physical channels corresponding to resource elements carrying information derived from a higher layer and uplink physical signals corresponding to resource elements which are used by a physical layer and do not carry the information derived from the higher layer. For example, a physical uplink shared channel (PUSCH), a physical uplink control channel (PUCCH), and a physical random access channel (PRACH) are defined as the uplink physical channels, and a demodulation reference signal (DMRS) for an uplink control/data signal and a sounding reference signal (SRS) for uplink channel measurement are defined as the uplink physical signals.

In the present disclosure, the PDCCH refers to a set of time-frequency resources or resource elements carrying downlink control information (DCI), the PCFICH refers to a set of time-frequency resources or resource elements carrying a control format indicator (CFI), the PHICH refers to a set of time-frequency resources or resource elements carrying a downlink acknowledgement/negative acknowledgement (ACK/NACK), and the PDSCH refers to as a set of time-frequency resources or resource elements carrying downlink data. In addition, the PUCCH refers to a set of time-frequency resources or resource elements carrying uplink control information (UCI), the PUSCH refers to a set of time-frequency resources or resource elements carrying uplink data, and the PRACH refers to a set of time-frequency resources or resource elements carrying a random access signal. In particular, in the present disclosure, a time-frequency resource or a resource element (RE) allocated to or belonging to the PDCCH/PCFICH/PHICH/PDSCH/PUCCH/PUSCH/PRACH is referred to as a PDCCH/PCFICH/PHICH/PDSCH/PUCCH/PUSCH/PRACH RE or a PDCCH/PCFICH/PHICH/PDSCH/PUCCH/PUSCH/PRACH resource. Thus, when it is said that a UE transmits the PUCCH/PUSCH/PRACH, it may be interpreted to mean that the UE transmits the UCI/uplink data/random access signal on the PUSCH/PUCCH/PRACH. When it is said that a gNB transmits the PDCCH/PCFICH/PHICH/PDSCH, it may be interpreted to mean that the gNB transmits the downlink data/DCI on the PDCCH/PCFICH/PHICH/PDSCH.

In the following, an orthogonal frequency division multiplexing (OFDM) symbol/subcarrier/RE where the CRS/DMRS/CSI-RS/SRS/UE-RS is allocated or configured is referred to as a CRS/DMRS/CSI-RS/SRS/UE-RS symbol/carrier/subcarrier/RE. For example, an OFDM symbol where a tracking RS (TRS) is allocated or configured is referred to as a TRS symbol, a subcarrier where which the TRS is allocated or configured is referred to as a TRS subcarrier, and an RE where which the TRS is allocated or configured is referred to as a TRS RE. In addition, a subframe configured for TRS transmission is referred to as a TRS subframe. Further, a subframe in which a broadcast signal is transmitted is referred to as a broadcast subframe or a PBCH subframe, and a subframe in which a synchronization signal (e.g., a primary synchronization signal (PSS) and/or a secondary synchronization signal (SSS)) is transmitted is referred to a synchronization signal subframe or a PSS/SSS subframe. An OFDM symbol/subcarrier/RE where the PSS/SSS is allocated or configured is referred to as a PSS/SSS symbol/subcarrier/RE.

In the present disclosure, a CRS port, a UE-RS port, a CSI-RS port, and a TRS port refer to an antenna port configured to transmit the CRS, an antenna port configured to transmit the UE-RS, an antenna port configured to transmit the CSI-RS, and an antenna port configured to transmit the TRS, respectively. Antenna ports configured to transmit the CRS may be distinguished from each other by the location of REs occupied by the CRS, which depends on the CRS ports. Antenna ports configured to transmit the CRS may be distinguished from each other by the location of REs occupied by the CRS, which depends on the CRS ports. Antenna ports configured to transmit the UE-RS may be distinguished from each other by the location of REs occupied by the UE-RS, which depends on the UE-RS ports. Antenna ports configured to transmit the CSI-RS may be distinguished from each other by the location of REs occupied by the CSI-RS, which depends on the CSI-RS ports. Therefore, the term 'CRS/UE-RS/CSI-RS/TRS port' may also be used to indicate a pattern of REs occupied by the CRS/UE-RS/CSI-RS/TRS in a predetermined resource region.

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 2:
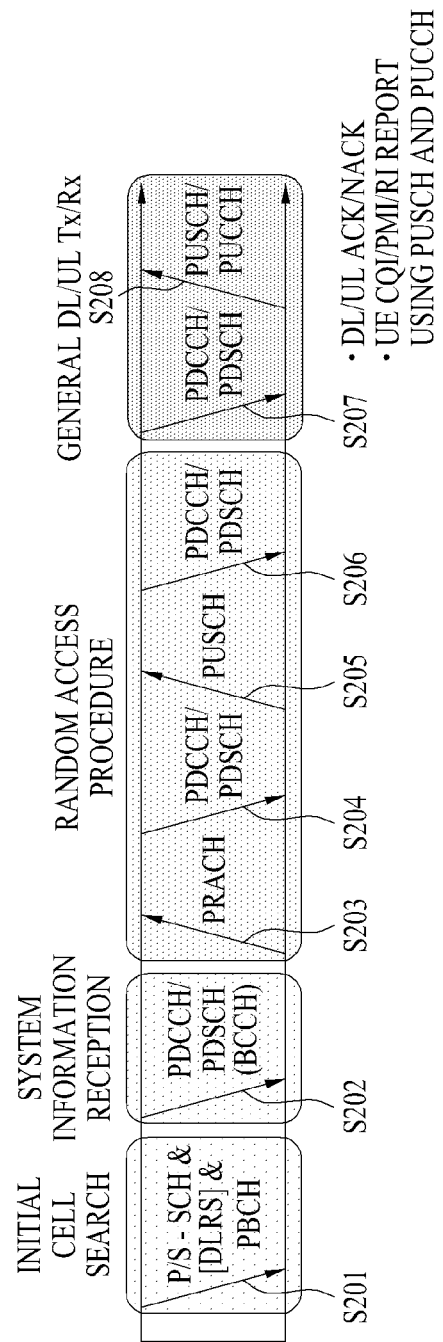
FIG. 2 is a diagram for explaining physical channels used for 3GPP system and a general signal transmission method using the physical channels.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3:
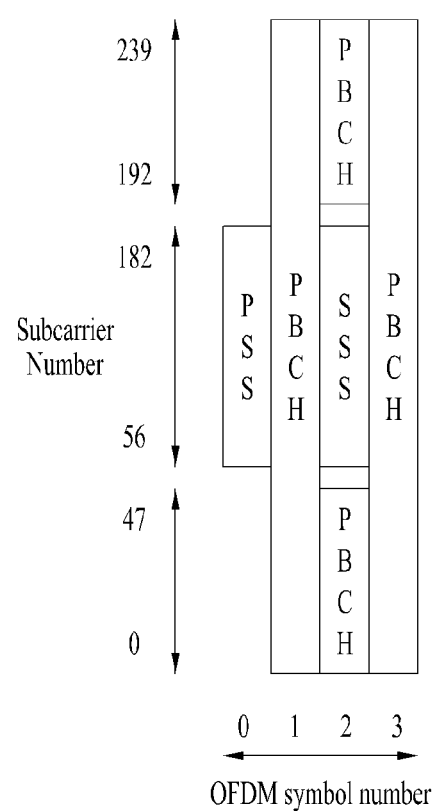
FIG. 3 is a view illustrating a structure of an SS/PBCH block used in an NR system.

FIG. 3 illustrates an SSB structure. The UE may perform cell search, system information acquisition, beam alignment for initial connection, DL measurement, etc. based on the SSB. The SSB is used interchangeably with the synchronization signal/physical broadcast channel (SS/PBCH) block.

Referring to FIG. 3, an SSB is composed of a PSS, a SSS and a PBCH. The SSB is composed of four consecutive OFDM symbols. The PSS, the PBCH, the SSS/PBCH and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

The NR system uses an OFDM transmission scheme or a similar transmission system. The new RAT system may conform to OFDM parameters different from the OFDM parameters of LTE. Alternatively, the new RAT system may conform to the numerology of legacy LTE/LTE-A, but have a larger system bandwidth (e.g., 100 MHz). Alternatively, one cell may support a plurality of numerologies. That is, UEs operating with different numerologies may coexist within one cell.

Figure 4:
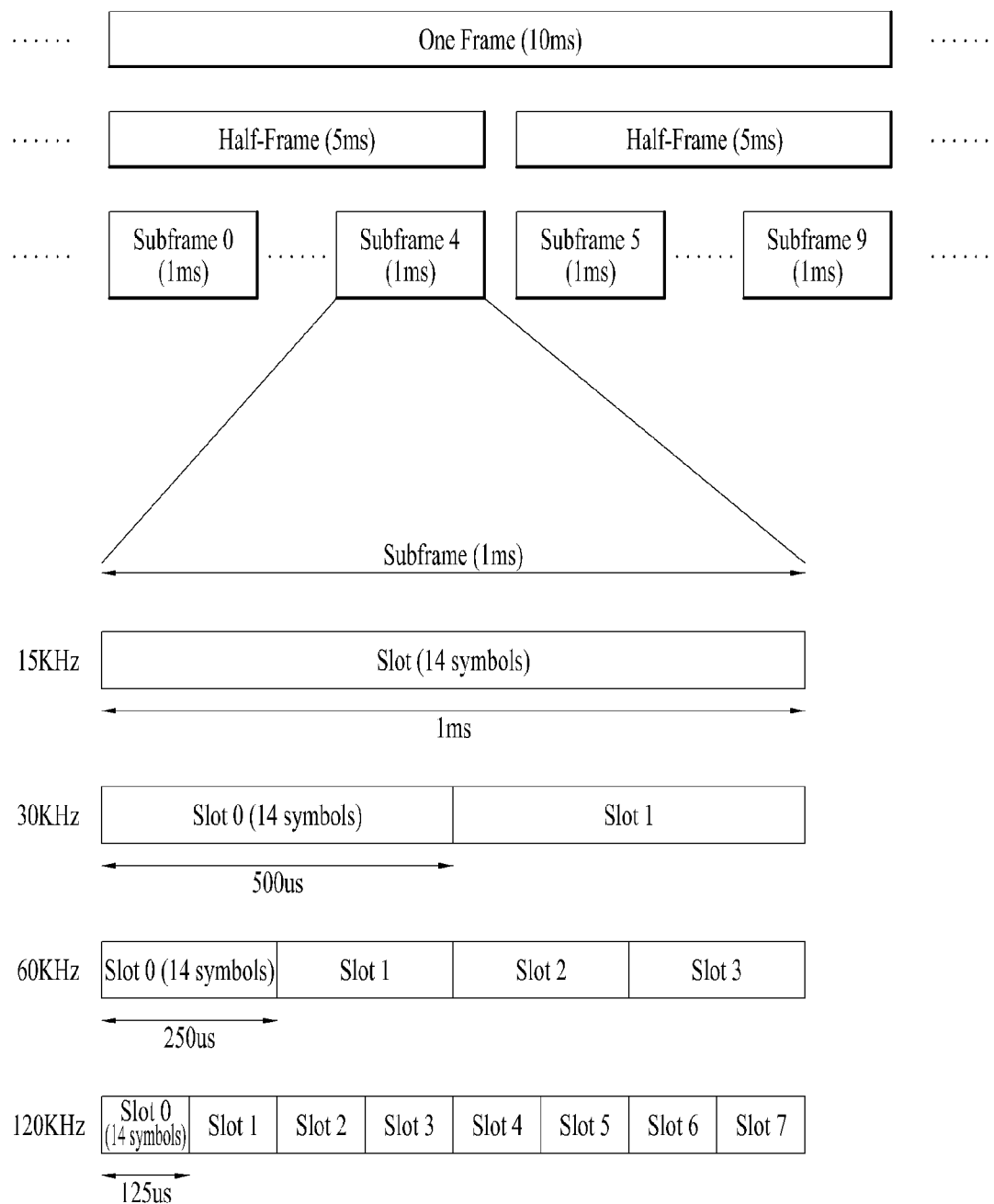
FIGS. 4 to 6 are diagrams for explaining the structures of a radio frame and a slot used in a new radio access technology (NR) system.

FIG. 4 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{subframe, u}_{slot}$: Number of slots in a subframe
* $N^{slot}_{symb}$: Number of symbols in a slot
* $N^{frame, u}_{slot}$: Number of slots in a frame Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 5:
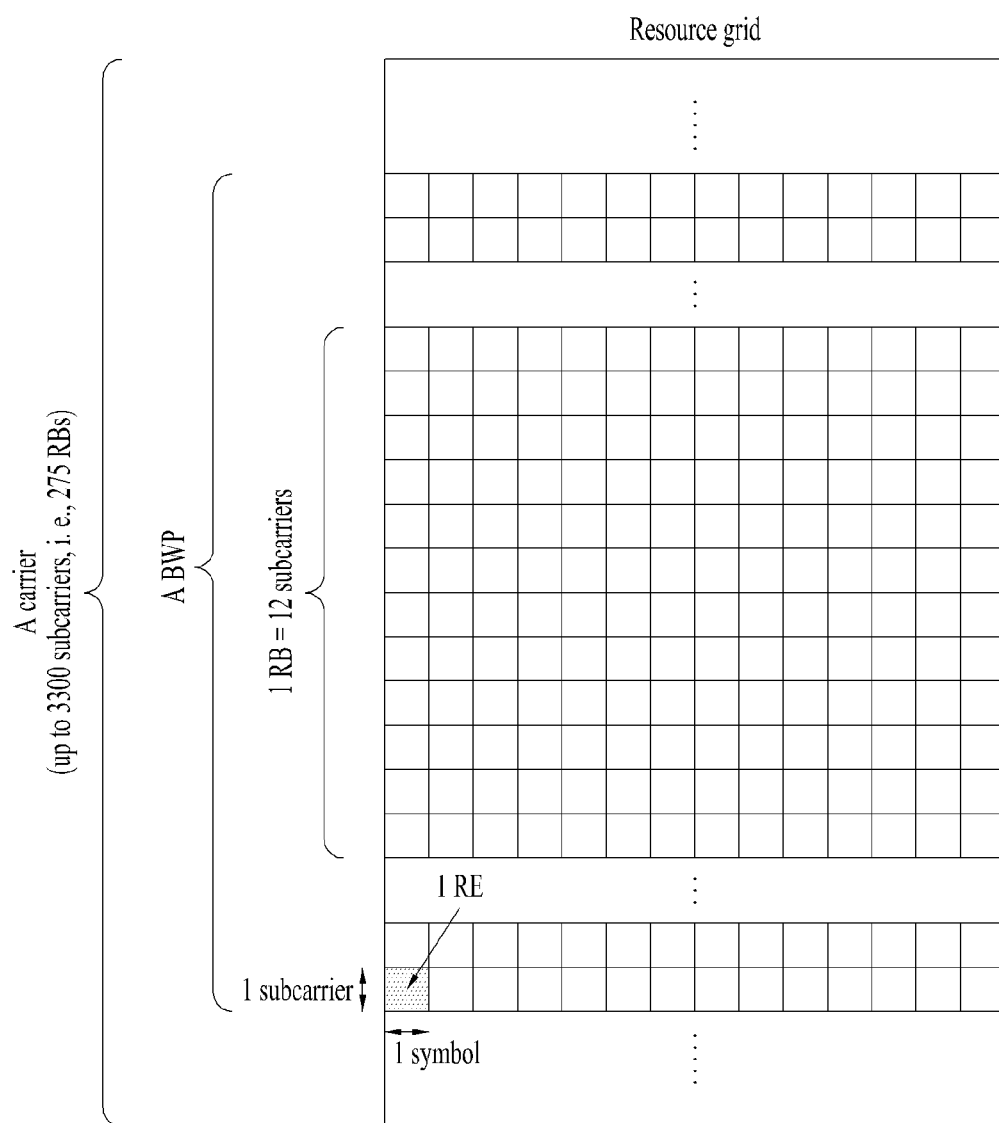

In the NR system, the OFDM(A) numerology (e.g., SCS, CP length, etc.) may be configured differently among a plurality of cells merged for one UE. Thus, the (absolute time) duration of a time resource (e.g., SF, slot or Tri) (referred to as a time unit (TU) for simplicity) composed of the same number of symbols may be set differently among the merged cells. FIG. 5 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 6:
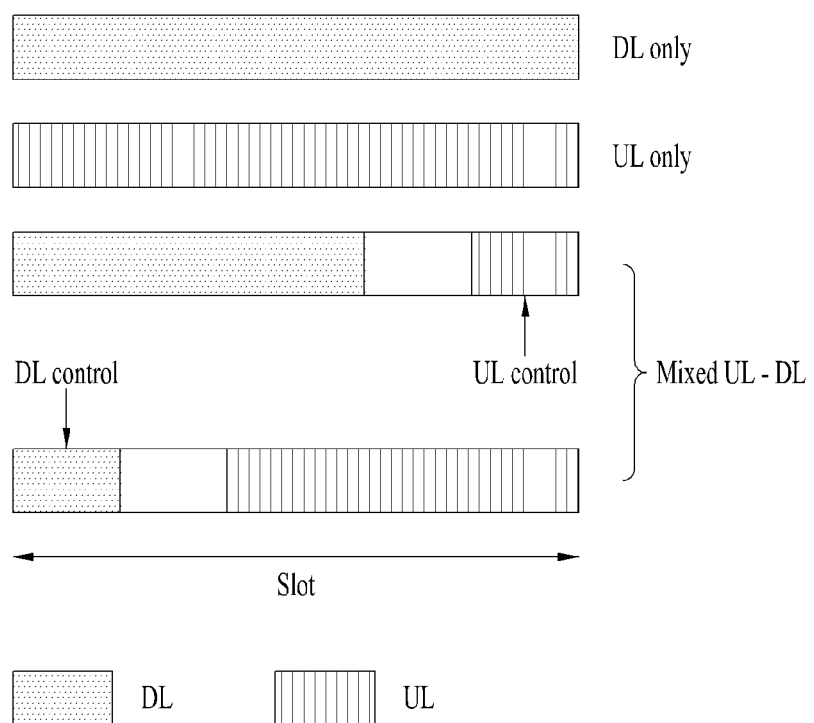

FIG. 6 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The guard period (GP) provides a time gap in the process of the UE switching from the transmission mode to the reception mode or from the reception mode to the transmission mode. Some symbols at the time of switching from DL to UL within a subframe may be configured as the GP.

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with a received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present disclosure to be described later are proposed in consideration of constraints resulting from the characteristics of analog BF or hybrid BF.

Figure 7:
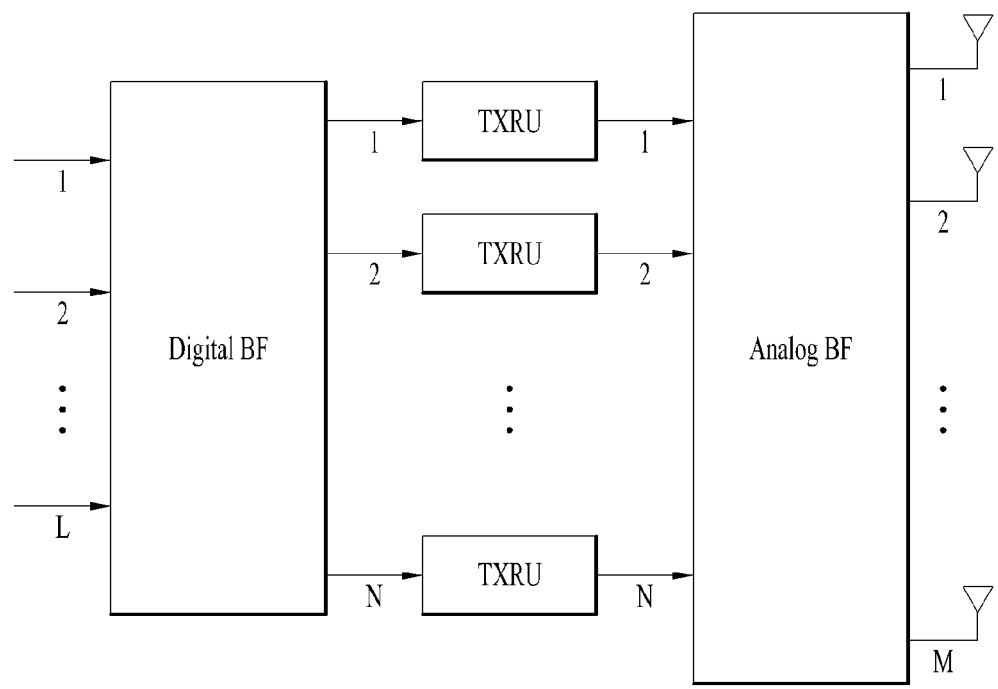
FIG. 7 abstractly illustrates a hybrid beamforming structure in terms of transceiver units (TXRUs) and physical antennas.

FIG. 7 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 7, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, the introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 8:
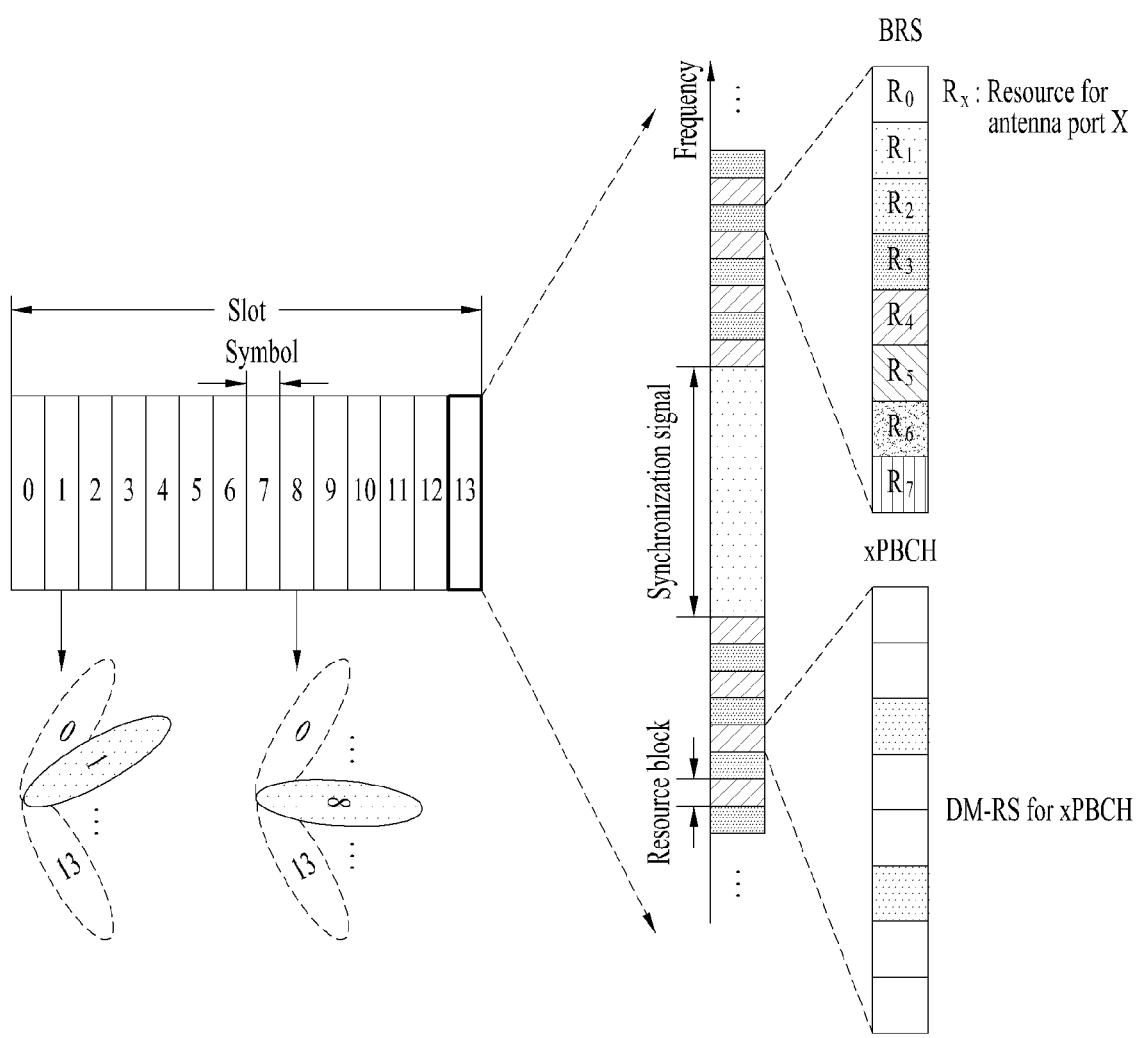
FIG. 8 illustrates beam sweeping operation for SSs and system information in a downlink transmission process

FIG. 8 is a view illustrating beam sweeping for an SS and system information during DL transmission. In FIG. 8, a physical resource or a physical channel for broadcasting system information of the NR system is referred to as an xPBCH. Analog beams from different antenna panels may be transmitted simultaneously in one symbol, and the introduction of a beam reference signal (BRS), which is transmitted for a single analog beam corresponding to a specific antenna panel as illustrated in FIG. 8, is under discussion in order to measure a channel per analog beam. BRSs may be defined for a plurality of antenna ports, and each antenna port of the BRSs may correspond to a single analog beam.

Unlike the BRSs, the SS or the xPBCH may be transmitted for all analog beams included in an analog beam group so that any UE may receive the SS or the xPBCH successfully.

Figure 9:
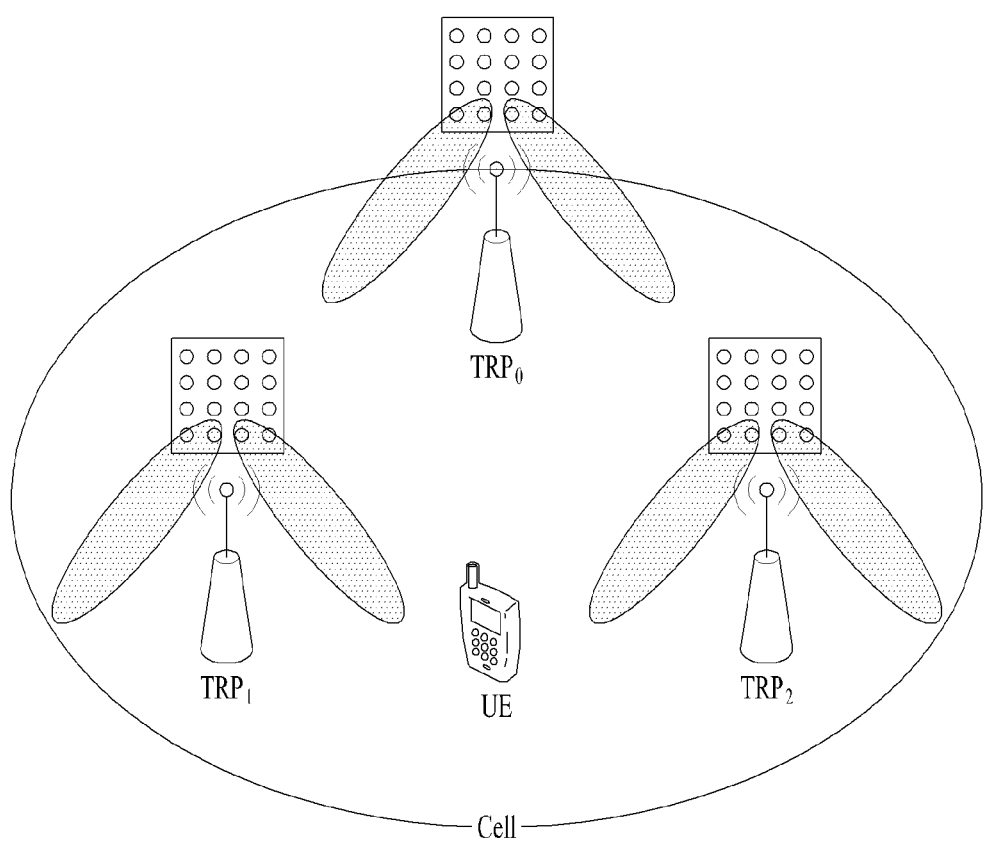
FIG. 9 illustrates a cell in the NR system.

FIG. 9 is a view illustrating an exemplary cell in the NR system.

Referring to FIG. 9, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Figure 10:
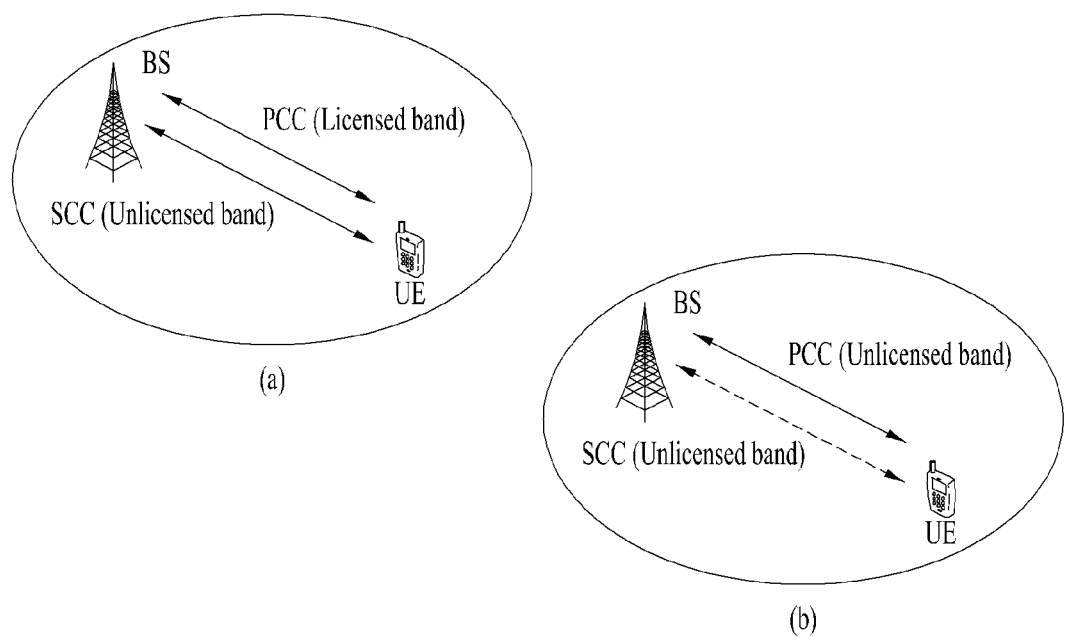
FIGS. 10, 11 and 12 are diagrams illustrating downlink (DL) transmission and uplink (UL) transmission in an unlicensed band.

FIG. 10 illustrates a wireless communication system supporting an unlicensed band applicable to the present disclosure.

Herein, a cell operating in a licensed band (L-band) is defined as an L-cell, and a carrier in the L-cell is defined as a (DL/UL) LCC. A cell operating in an unlicensed band (U-band) is defined as a U-cell, and a carrier in the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on an LCC and a UCC where carrier aggregation is applied as shown in FIG. 10 (a), the LCC and the UCC may be set to a primary CC (PCC) and a secondary CC (SCC), respectively. The BS and the UE may transmit and receive signals on one UCC or on a plurality of UCCs where carrier aggregation is applied as shown in FIG. 10 (b). In other words, the BS and UE may transmit and receive signals on UCC(s) with no LCC.

Signal transmission and reception operations in U-bands, which will be described later in the present disclosure, may be applied to all of the aforementioned deployment scenarios (unless specified otherwise).

The NR frame structure shown in FIG. 5 may be used for operation in a U-band. The configuration of OFDM symbols reserved for UL/DL signal transmission in a frame structure for the U-band may be determined by the BS. In this case, the OFDM symbol may be replaced with an SC-FDM(A) symbol.

For DL signal transmission in the U-band, the BS may inform the UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of occupied OFDM symbols in subframe #n based on a specific filed in DCI (e.g., Subframe configuration for LAA' field, etc.), which is received in subframe #n−1 or subframe #n from the BS.

Table 3 shows how the 'Subframe configuration for LAA' field indicates the configuration of OFDM symbols used to transmit DL physical channels and/or physical signals in the current and/or next subframe.

TABLE 3

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For UL signal transmission in the U-band, the BS may provide information on a UL transmission interval to the UE through signaling.

Specifically, in the LTE system supporting U-bands, the UE may obtain 'UL duration' and 'UL offset' information on subframe #n from the 'UL duration and offset' field in detected DCI.

Table 4 shows how the 'UL duration and offset' field indicates the configurations of a UL offset and a UL duration.

TABLE 4

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |

TABLE 4-continued

| Value of<br>'UL duration and offset' field | UL offset, l<br>(in subframes) | UL duration, d<br>(in subframes) |
|---|---|---|
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the 'UL duration and offset' field configures (or indicates) UL offset 1 and UL duration d for subframe #n, the UE may not need to receive DL physical channels and/or physical signals in subframe #n+1+i (where i=0, 1, . . . , d−1).

The BS may perform one of the following unlicensed band access procedures (e.g., channel access procedures (CAPs)), for a DL signal transmission in an unlicensed band.

(1) First DL CAP Method

Figure 11:
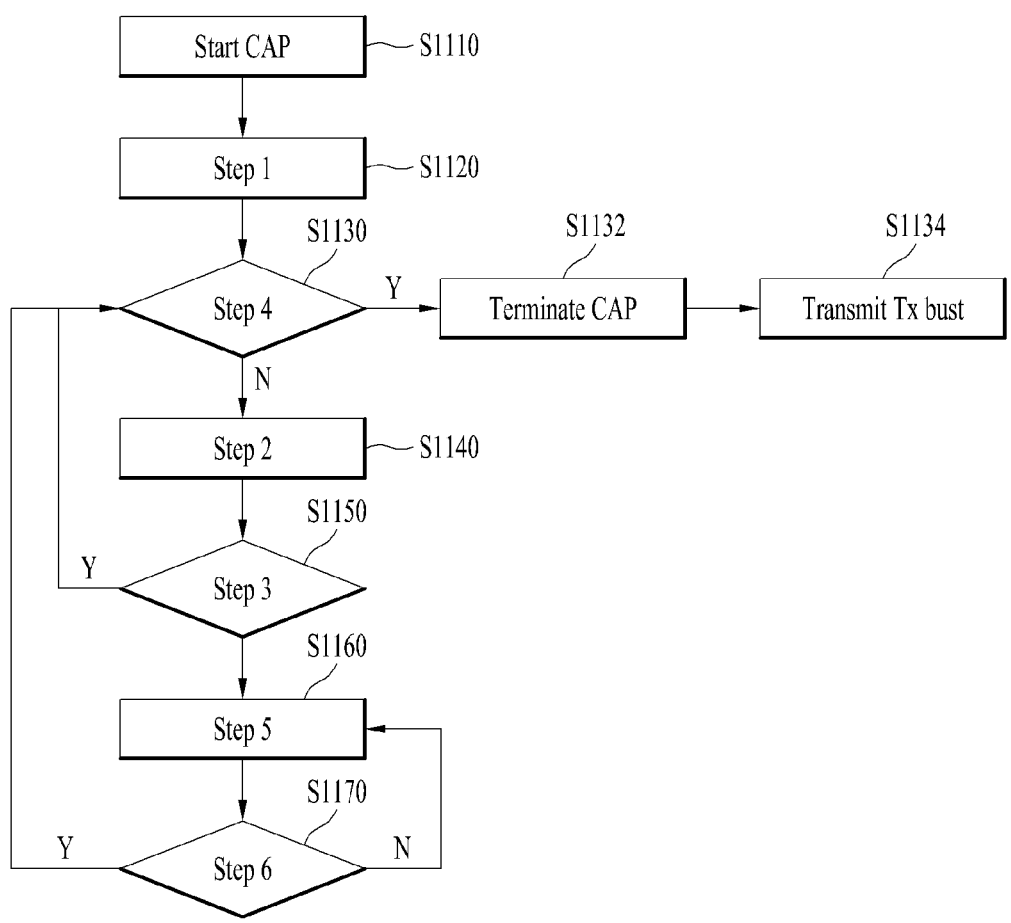

FIG. 11 is a flowchart illustrating a CAP for a DL signal transmission in an unlicensed band at a BS.

For a DL signal transmission (e.g., transmission of a signal including a PDSCH/PDCCH/EPDCCH) in an unlicensed band, a BS may initiate a CAP (S1110). The BS may randomly select a backoff counter N within a contention window (CW) according to step 1. N is set to an initial value, $N_{init}$ (S1120). $N_{init}$ is a random value selected from among the values between 0 and $CW_p$. Subsequently, if the backoff counter N is 0 in step 4 (Y in S1130), the BS terminates the CAP (S1132). Subsequently, the BS may transmit a Tx burst including a PDSCH/PDCCH/EPDCCH (S1134). On the other hand, if the backoff counter N is not 0 (N in S1130), the BS decrements the backoff counter N by 1 according to step 2 (S1140). Subsequently, the BS determines whether a channel of U-cell(s) is in an idle state (S1150). If the channel is in the idle state (Y in S1150), the BS determines whether the backoff counter N is 0 (S1130). On the contrary, if the channel is not idle in step S1150, that is, the channel is busy (N in S1150), the BS determines whether the channel is in the idle state for a defer duration $T_d$ (25 usec or more) longer than a slot time (e.g., 9 usec) according to step 5 (S1160). If the channel is idle for the defer duration (Y in S1170), the BS may resume the CAP. The defer duration may span a period of 16 usec and the following $m_p$ consecutive slot durations (e.g., 9 usec). On the contrary, if the channel is idle for the defer duration (N in S1170), the BSS re-performs step S1160 to check again whether the channel of the U-cell(s) is idle for a new defer duration.

Table 5 illustrates that $m_p$, a minimum CW, a maximum CW, a maximum channel occupancy time (MCOT), and an allowed CW size for a CAP vary according to a channel access priority class.

TABLE 5

| Channel<br>Access<br>Priority<br>Class (p) | $m_p$ | $CW_{min,p}$ | $CW_{max,p}$ | $T_{mcot,p}$ | allowed<br>$CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various ways. For example, the CW size may be adjusted based on the probability of HARQ-ACK values corresponding to PDSCH transmission(s) within a predetermined time period (e.g., a reference TU) being determined to be NACK. In the case where the BS transmits a DL signal including a PDSCH related to a channel access priority class p on a carrier, when the probability of HARQ-ACK values corresponding to PDSCH transmission(s) in a reference subframe k (or a reference slot k) is 80% (z=80%), the BS increments a CW value set for each priority class to the next higher value. Alternatively, the BS maintains the CW value set for each priority class to be an initial value. The reference subframe (or reference slot) may be defined as the starting subframe (or starting slot) of the latest transmission on the carrier, for which at least some HARQ-ACK feedback is available.

(2) Second DL CAP Method

The BS may perform a DL signal transmission (e.g., a signal transmission including a discovery signal, without a PDSCH/PDCCH/EPDCCH) in an unlicensed band according to the second DL CAP method as described below.

If the signal transmission duration of the BS is 1ms or less, the BS may perform a DL signal transmission (a signal including a discovery signal, without a PDSCH) in an unlicensed band, immediately after a corresponding channel is sensed as idle for at least a sensing interval $T_{drs}$ (=25 us). $T_{drs}$ includes a duration of $T_f$ (=16 us) immediately followed by one slot duration $T_{sl}$ (=9 us).

(3) Third DL CAP method

The BS may perform the following CAPs for a DL signal transmission on multiple carriers of an unlicensed band.

1) Type A: The BS performs a CAP for multiple carriers based on a counter N (considered in the CAP) defined for each carrier, and performs a DL signal transmission based on the CAP.

Type A1: The counter N is determined independently for each carrier, and a DL signal transmission on each carrier is performed based on the counter N for the carrier.

Type A2: An N value for a carrier with the largest CW size is determined as the counter N for each carrier, and a DL signal transmission on each carrier is performed based on the counter N for the carrier.

2) Type B: The BS performs a CAP based on a counter N only for a specific one of a plurality of carriers. Before a signal transmission on the specific carrier, the BS performs a DL signal transmission by determining whether the channel is idle on the other carriers.

Type B1: A single CW size is defined for a plurality of carriers, and the BS uses the single CW size, when performing a CAP based on a counter N for a specific carrier.

Type B2: A CW size is defined for each carrier, and the largest of the CW sizes is used in determining $N_{init}$ for a specific carrier.

The UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

(1) Type 1 UL CAP Method

Figure 12:
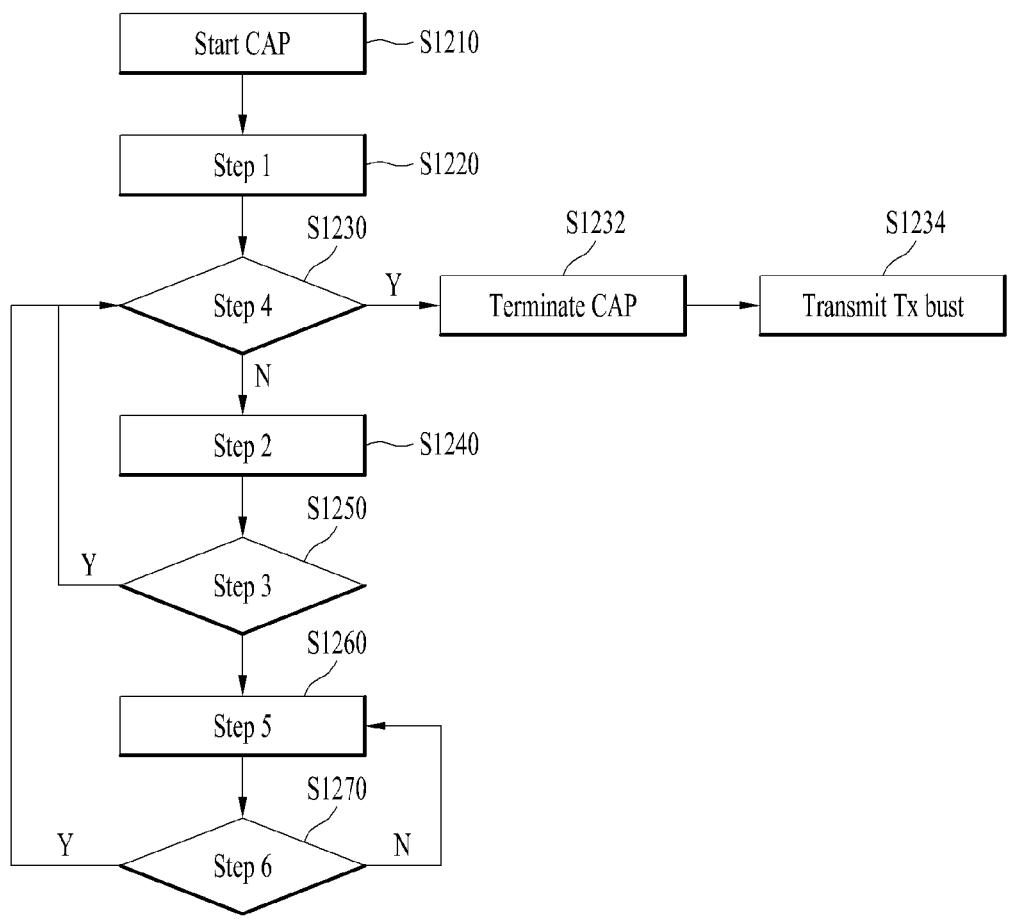

FIG. 12 is a flowchart illustrating a Type 1 CAP for a UL signal transmission at a UE For a signal transmission in an unlicensed band, the UE may initiate the CAP (S1210). The UE may randomly select a backoff counter N within a CW according to step 1. N is set to an initial value $N_{init}$ (S1220). $N_{init}$ is a value selected randomly from among the values between 0 and $CW_p$. Subsequently, if the backoff counter value N is 0 according to step 4 (Y in S1230), the UE ends the CAP (S1232). Subsequently, the UE may perform a Tx burst transmission (S1234). On the other hand, if the backoff counter value is not 0 (N in S2130), the UE decrements the backoff counter value by 1 according to step 2 (S1240). Subsequently, the UE checks whether a channel of U-cell(s) is idle (S1250). If the channel is idle (Yin S1250), the UE checks whether the backoff counter value is 0 (S1230). On the contrary, if the channel is not idle in step S1250, that is, the channel is busy (N in S1250), the UE checks whether the channel is idle for a defer duration $T_d$ (25 usec or more) longer than a slot time (e.g., 9 usec) according to step 5 (S1260). If the channel is idle for the defer duration (Y in S1270), the UE may resume the CAP. The defer duration may span a period of 16 usec and the following $m_p$ consecutive slot durations (e.g., 9 usec). On the other hand, if the channel is busy for the defer duration (N in S1270), the UE re-performs S1260 to check again whether the channel is idle for a new defer duration.

Table 6 illustrates that $m_p$, a minimum CW, a maximum CW, an MCOT, and an allowed CW size for a CAP vary according to a channel access priority class.

TABLE 6

| Channel Access Priority Class (p) | $m_p$ | $CW_{min, p}$ | $CW_{max, p}$ | $T_{ulmcot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot, p}$ = 10 ms if the higher layer parameter 'absenceOfAnyOtherTechnology-r14' indicates TRUE, otherwise, $T_{ulmcot, p}$ = 6 ms.
NOTE 2:
When $T_{ulmcot, p}$ = 6 ms it may be increased to 8 ms by inserting one or more gaps. The minimum duration of a gap shall be 100 μs. The maximum duration before including any such gap shall be 6 ms.

A CW size applied to the Type 1 UL CAP may be determined in various ways. For example, the CW size may be adjusted based on whether a new data indicator (NDI) value for at least one HARQ process related to the HARQ process ID, HARQ_ID_ref of a UL-SCH within a predetermined time period (e.g., a reference TU) is toggled. In the case where the UE performs a signal transmission on a carrier by using a Type 1 CAP related to a channel access priority class p, when an NDI value for at least one HARQ process related to HARQ _ID_ref is toggled, the UE sets $CW_p=CW_{min,p}$ for all priority classes p∈{1,2,3,4}. Otherwise, the UE increments CWp for all priority classes p∈{1, 2,3,4} to the next higher allowed value.

Reference frame $n_{ref}$ (or reference slot $n_{ref}$) is determined as follows.

When the UE receives a UL grant in subframe $n_g$, and performs a transmission including a UL-SCH without gaps, starting from subframe (or slot) $n_0$ in a subframe (or slot) $n_0$, $n_1, \ldots, n_w$ (herein, subframe (or slot) $n_w$ is the latest subframe (or slot) before subframe (or slot) $n_{g-3}$ in which the UE has transmitted the UL-SCH based on the Type 1 CAP)), reference subframe (or slot) $n_{ref}$ is subframe (or slot) $n_0$.

(2) Type 2 UL CAP Method

When the UE uses the Type 2 CAP for a UL signal transmission (e.g., transmission of a signal including a PUSCH) in an unlicensed band, the UE may transmit the UL signal (e.g., the signal including a PUSCH) in the unlicensed band immediately after the UE sense that a channel is idle at least for a sensing interval $T_{short\_ul}$=25 us. $T_{short\_ul}$ includes a duration of $T_f$ (=16 us) immediately followed by one slot duration $T_{sl}$=9 us. $T_f$ includes an idle slot duration $T_{sl}$ at the start of $T_f$.

In the 3GPP LTE(-A) system, it is defined that a UE reports CSI to a BS. The CSI generically refers to information representing the quality of a radio channel (or radio link) established between antenna ports between the UE and the BS. For example, the CSI includes an RI, a PMI, and a CQI. The RI is information about the rank of a channel, indicating the number of streams that the UE may receive in the same time-frequency resources. Since the RI depends on long-term fading of the channel, the UE feeds back the RI to the BS, with a longer periodicity than the PMI and the CQI. The PMI is a value reflecting channel space characteristics. The PMI indicates a UE-preferred precoding index determined based on a metric such as a signal to interference plus noise ratio (SINR). The CQI indicates the strength of the channel. In general, the CQI represents a reception SINR that may be obtained when the BS uses the PMI. In the 3GPP LTE(-A) system, the BS may configure multiple CSI processes for the UE and receive a report of CSI for each process. A CSI process is defined by CSI-RS resources for measurement of the quality of a signal from the BS and CSI interference measurement (CI-IM) resources for interference measurement.

The network may transmit a known signal on each beam periodically or aperiodically, so that the UE may measure beams to be used in a corresponding cell (or beams available to a gNB). The known signal may be, for example, a measurement reference signal (MRS), a beam reference signal (BRS), or a beamformed CSI-RS. For the convenience of description, the known signals will be collectively referred to as the BRS. The UE may select a gNB Tx beam suitable for the UE by measuring the BRS. If Rx beams of the UE are also considered, the UE may perform measurement using different UE Rx beams and select beam combination(s) of gNB Tx beam(s) and UE Rx beam(s). After this process, Tx-Rx beam association between the gNB and the UE may be determined explicitly or implicitly. Network decision-based beam association or UE decision-based beam association may be performed.

Network decision-based beam association may be performed as follows. The network may indicate to the UE to report X higher Tx-Rx beam combinations based on measurement results. The UE may report a predefined number of beam combinations, as many beam combinations as a number signaled (through higher-layer signaling) by the network, or all beam combinations with measurement results exceeding a specific threshold. The specific threshold may be predefined or signaled by the network. When each UE has a different decoding performance, categories may be defined in consideration of the decoding performances of UEs, and a threshold may be defined for each category. Further, a beam combination may be reported periodically and/or aperiodically, as indicated by the network. Alternatively, when the difference between a previous report result and a current measurement result is equal to or larger than a predetermined level, an event-triggered report may be transmitted. The predetermined level may be predefined or signaled (through higher-layer signaling) by the network. The UE may report (one or more) beam associations determined by the above-described method. When multiple beam indexes are reported, beams may be prioritized. For example, the UE may report beam associations such that the network may interpret the beam associations as, for example, a first preferred beam, a second preferred beam, and so on.

Because a gNB and a UE communicate physically apart from each other in a mobile communication system, the gNB and the UE should synchronize their system frequencies (e.g., carrier frequencies, sampling frequencies, and so on) and timings (e.g., slot indexes, symbol boundaries, and so on) with each other. For this purpose, the UE needs to detect a carrier frequency and an OFDM symbol boundary at the physical channel stage (i.e., the PHY layer), and the gNB transmits an RS to help the UE to detect a carrier frequency offset and an OFDM symbol boundary.

In an NR system under discussion, a system bandwidth is variable and each UE may have a different bandwidth. Further, it is expected that the NR system will use a high-frequency band having a much larger bandwidth than that of the frequency band used in the LTE/LTE-A system. For this reason, the UE generally sets a UE bandwidth to the bandwidth of a synchronization signal (SS) during initial access. Then, the UE completes time tracking and frequency tracking until camping on the system, and performs a stable RACH process. For the time and frequency tracking, an RS for time and frequency tracking should be defined. In general, an SS block may be used most widely as an RS for time and frequency tracking.

However, in the case where a narrowband signal such as an SS block is used as a time and frequency TRS (TFRS) and a UE transmits/receives a signal in a wideband under a wideband and multi-beam environment, the resolution of time tracking is high. Hence, when the length of a cyclic prefix (CP) used to prevent inter-symbol interference in an OFDM system is short, system performance may be degraded. To prevent the degradation of system performance, the CP length may be set to be larger than a multi-path delay which may occur in a channel environment, but only to decrease system efficiency. To solve the problem and increase the time tracking resolution and frequency tracking accuracy, there is a need for defining a TFRS transmitted in a wideband. The TFRS is also called the TRS. The present disclosure proposes an RS for helping a UE to perform time and frequency tracking in a wideband.

<Method 1: Periodic TFRS in SS Block Duration>

Figure 13:
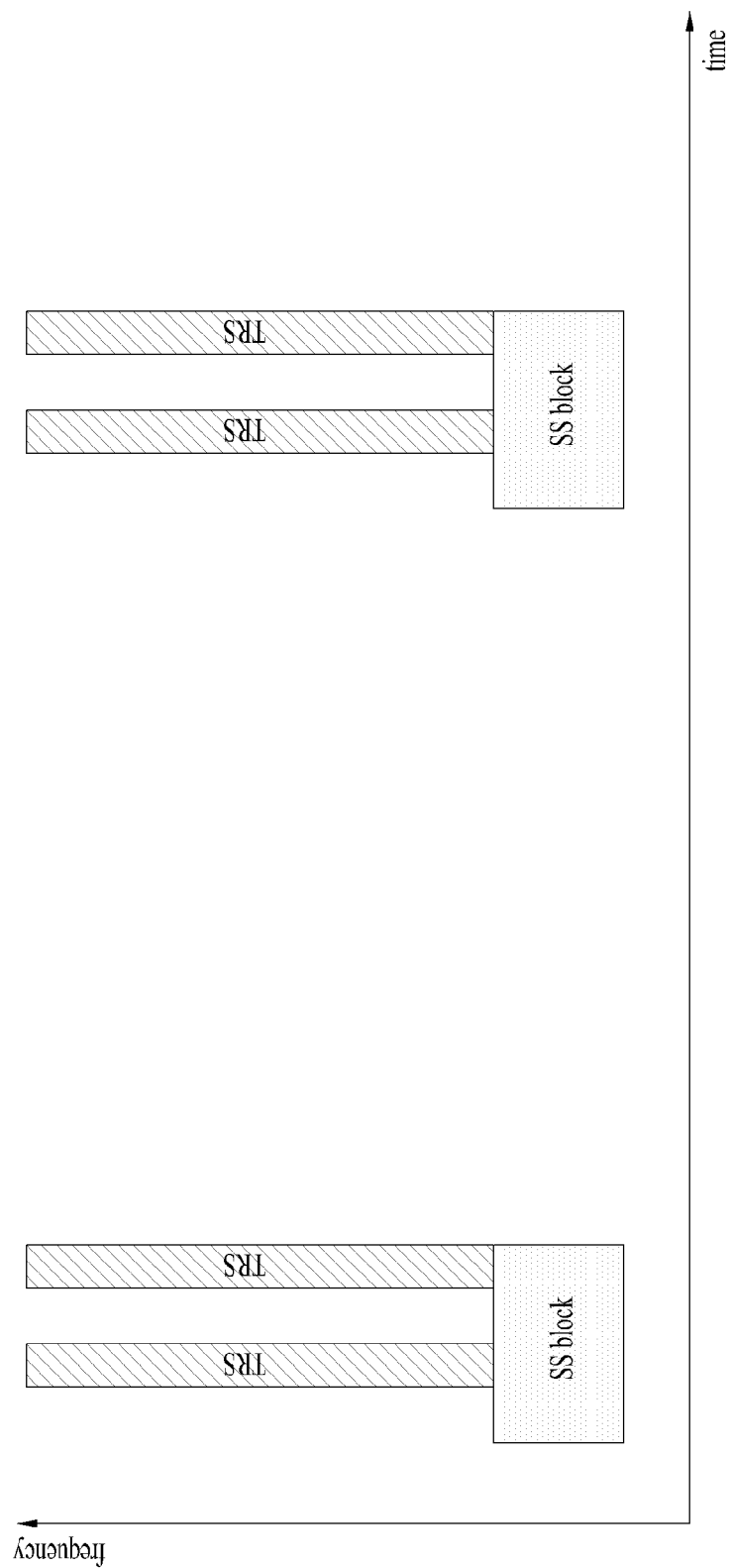
FIG. 13 is a diagram illustrating a method of transmitting a time and frequency tracking reference signal (TRS) according to the present disclosure.

FIG. 13 illustrates a method of transmitting a TFRS according to the present disclosure. Particularly, the TFRS is transmitted multiplexed with an SS block in FIG. 13.

In the NR system, an SS block is periodically transmitted to enable a UE to perform cell detection, RSRP measurement for mobility, time and frequency tracking, and system information reception. The SS block is transmitted in each beam direction to secure cell coverage in a multi-beam environment. Therefore, a gNB may transmit a TFRS during a time period in which the SS block is transmitted, for periodic TFRS transmission on each beam, as illustrated in FIG. 13. When the gNB transmits the TFRS in the SS block in this manner, the gNB does not need to separately transmit information about association (e.g., quasi-collocation (QCL)) between beam management and the TFRS to the UE. If the large-scale properties of a symbol on an antenna port can be inferred from a channel carrying a symbol on another antenna port, it is said that the two antenna ports are quasi-collocated. The large-scale properties include one or more of a delay spread, a Doppler spread, a Doppler shift, an average gain, an average delay, and spatial Rx parameters.

The SS block may include various signals. For example, an SS (e.g.; PSS and SSS) and a PBCH are under discussion as main signals to be included in the SS block. Because the PSS and the SSS are generally used for cell detection and neighbor cell measurement, it is difficult to transmit the TFRS in an SS region (e.g., OFDM symbol(s) to which the SS's are mapped) of the SS block. However, considering that the PBCH is channel-encoded and transmitted a plurality of times over a plurality of slots, it is possible to transmit the TFRS in a PBCH region (e.g., OFDM symbol(s) to which the PBCH is mapped) of the SS block. In this regard, the TFRS may be defined in the following structures.

The TFRS is transmitted outside the band of the SS block.

While the TFRS is transmitted outside the band of the SS block in the SS (OFDM symbol) region of the SS block, the TFRS is transmitted in time-frequency resources including the PBCH band in the PBCH (OFDM symbol) region within the SS block. When the TFRS is transmitted in the PBCH band within the SS block, the TFRS may also be used as a demodulation reference signal (DMRS) for the PBCH. Alternatively, the DMRS for the PBCH may be used as a part of the TFRS.

When the gNB operates in a wideband (i.e., the gNB operates a cell operating in a wideband) and the UE accessing the gNB operates in a much wider band than that of the SS block, the gNB may transmit data or a control message in a frequency band other than the band of the SS block in an SS block transmission time area. In this case, the TFRS may be transmitted as a DMRS for the data or the control message transmitted in the SS block transmission (time) area. In this case, when the data or the control message is transmitted very often, the TFRS may be transmitted only when the data or the control message is transmitted. However, the gNB may also transmit only the TFRS without any transmission of data or a control message, to serve the purpose of the TFRS.

When the TFRS is used as the DMRS, the densities of the TFRS in the frequency domain and the time domain or the number of transmission antenna ports for the TFRS may be different depending on whether data or a control message is transmitted. Further, the time-domain TFRS density may be different depending on whether the TFRS is used for time tracking only or for frequency tracking as well as time tracking. For example, when the TFRS is used for time tracking only, the TFRS is transmitted in four resource elements (REs) per RB in one of the OFDM symbols of the SS block. When the TFRS is used for frequency tracking as well, the TFRS is transmitted in two of the OFDM symbols of the SS block, in four REs per RB in the first symbol of the two symbols and four REs per RB in the second symbol.

Although the TFRS may be transmitted in each SS block (i.e., at each transmission times of the SS block), the TFRS may be transmitted only in some SS blocks (i.e., only at some transmission times of the SS block) or only by some beams according to the positions of UEs within the service area of the gNB, to decrease the system overhead of the TFRS transmission. When the TFRS is transmitted only at some transmission times of the SS block or only by some beams, various methods of informing a UE of the TFRS transmission may be defined. For example, the UE may be informed of TFRS transmission in one of the following methods.

The UE determines the presence or absence of the TFRS by blind detection.

According to this method, the TFRS has only to be transmitted in a TFRS bandwidth. Therefore, there is no system overhead, but occurrence of false alarm may lead to degradation of TFRS performance.

The presence or absence of the TFRS and resource allocation information for the TFRS in an SS block transmission area are indicated dynamically by DCI. That is, the DCI indicates whether the TFRS exists in the specific SS block transmission area and how the TFRS exists. Despite an increased system overhead and an increased UE complexity, this method increases the flexibility of resource use and hence enables efficient use of radio resources.

Transmission or non-transmission of the TFRS and resource allocation information for the TFRS are indicated to the UE semi-statically by an RRC connection message (e.g., an RRC connection setup message). According to this method, system overhead is small, and variable TFRS transmission is possible depending on the presence or absence of a UE for each beam. That is, even though the gNB configures the TFRS, the gNB may or may not transmit the TFRS according to whether there is a UE in a corresponding beam direction for each beam.

Information indicating transmission or non-transmission of the TFRS and resource allocation information for the TFRS are broadcast to UE(s) within the service area of the gNB semi-statically by system information. Despite the benefit of little system overhead, it is difficult to use radio resources variably with this method.

Candidates for TFRS transmission resources may be signaled by an RRC connection message or system information, and whether the TFRS is actually transmitted may be signaled to the UE by DCI or determined through blind detection by the UE.

<Method 2: TFRS in Area Other Than SS Block Duration>

The present disclosure proposes that the TFRS is transmitted by using a CSI-RS for beam management (BM), and the CSI-RS used as the TFRS is configured with a higher density than the CSI-RS for BM.

Figure 14:
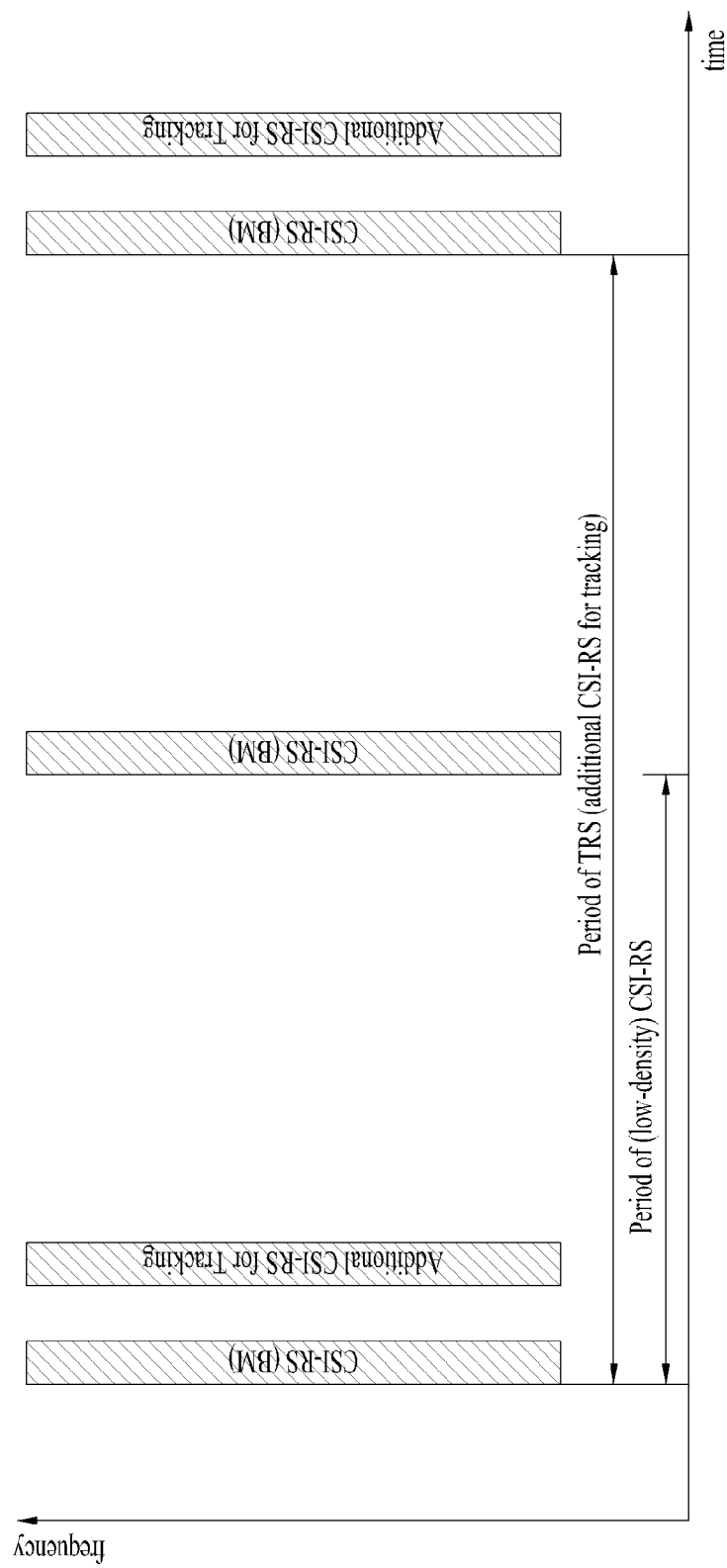
FIGS. 14, 15 and 16 are diagrams illustrating other methods of transmitting a TRS according to the present disclosure.
Figure 15:
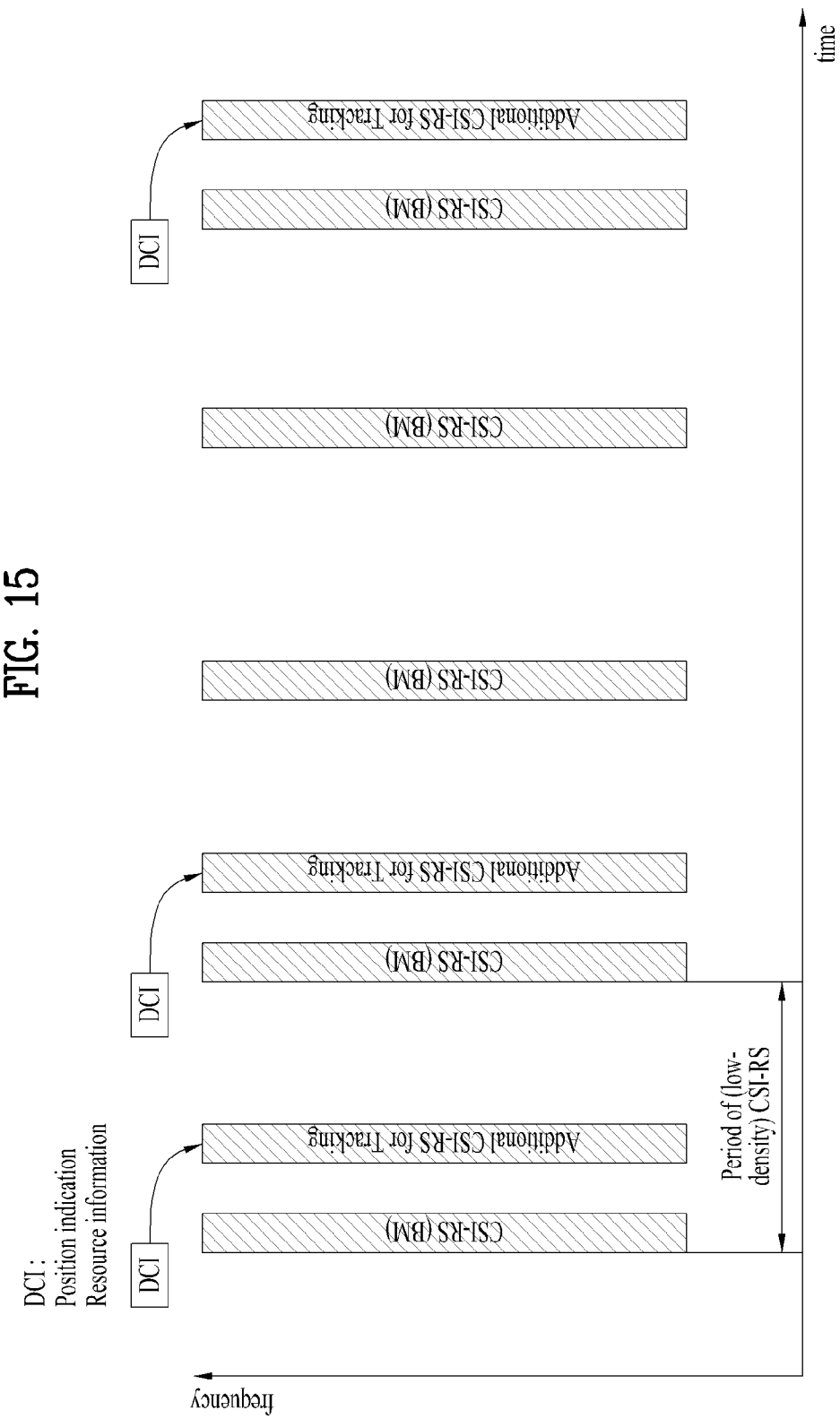
Figure 16:
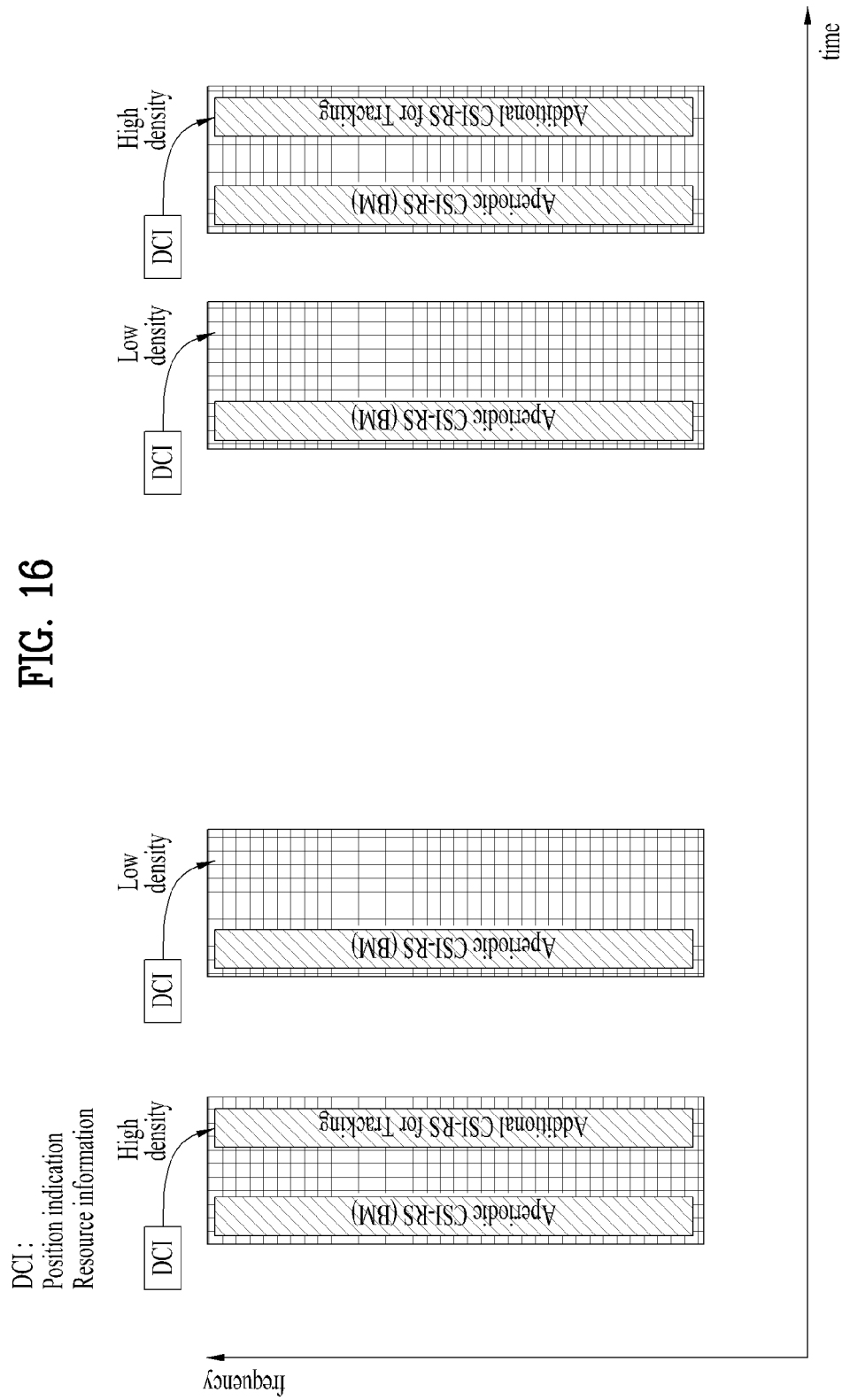

FIGS. 14, 15 and 16 illustrate different methods of transmitting a TFRS according to the present disclosure. Particularly, FIGS. 14 and 15 illustrate periodic TFRSs, and FIG. 16 illustrates an aperiodic TFRS.

Method 2-1) Periodic TFRS in Area Other than SS Block Duration

If a periodic CSI-RS for BM is defined, the periodic TFRS and the CSI-RS for BM are common in that they require wideband transmission and beam-wise transmission. However, considering that the TFRS is intended to allow a UE to obtain the path profile of a channel, for time tracking, a signal with a low density on the frequency axis such as the periodic CSI-RS for BM may not be used for time tracking. In this regard, the present disclosure proposes that the frequency-axis density of the periodic CSI-RS for BM is increased such that the periodic CSI-RS for BM is used as the TFRS. Therefore, the CSI-RS used as the TFRS may be configured to include the CSI-RS for BM. Referring to FIG. 6 or FIG. 7, a low-density periodic CSI-RS for BM and a high-density periodic CSI-RS for BM are defined according to use purposes. The low-density CSI-RS is used for BM (see "CSI-RS (BM)" in FIG. 14 or FIG. 15), and an additional CSI-RS for tracking (see "Additional CSI-RS for Tracking" in FIG. 14 or FIG. 15) is added to the low-density CSI-RS and used as the TFRS, that is, for tracking. The network/gNB may configure and transmit the high-density CSI-RS to the UE so that the UE uses the high-density CSI-RS as the TFRS. Although a high density basically refers to a density on the frequency axis, the high density may also mean a high density on the time axis or an increased number of (OFDM) symbols carrying a CSI-RS to enable the UE to use the CSI-RS for frequency tracking. Because the TFRS needs to be delivered in two or more OFDM symbols, for frequency tracking, the TFRS may include the CSI-RS for BM and the additional CSI-RS for tracking. That is, referring to FIG. 6 or FIG. 7, the UE may perform frequency tracking by using a "CSI-RS (BM)" and an "Additional CSI-RS for Tracking" which are adjacent to each other. That is, the periodic CSI-RS configured/allocated as the TFRS may have a higher density than the periodic CSI-RS for BM at least in the frequency domain. When the TFRS is used for frequency tracking, the TFRS may also have a higher density than the periodic CSI-RS for BM in the time domain. A high density in the frequency domain may mean a large number of subcarriers to which the CSI-RS is mapped in a frequency band of a predetermined size, whereas a high density in the time domain may mean a large number of OFDM symbols to which the CSI-RS is mapped in a time period of a predetermined duration. For example, the tracking CSI-RS may be configured in/allocated to more REs in a frequency band of a predetermined size in an OFDM symbol carrying the CSI-RS for tracking than REs to which the CSI-RS for BM is mapped in a frequency band of the same size in an OFDM symbol carrying the CSI-RS for BM. When the tracking CSI-RS is used for frequency tracking as well, the tracking CSI-RS may be configured in/allocated to more OFDM symbols in a time period of a predetermined duration in OFDM symbols carrying the CSI-RS for tracking than OFDM symbols to which the CSI-RS for BM is mapped in a time period of the same duration in OFDM symbols carrying the CSI-RS for BM. A high-density CSI-RS may be configured as the TFRS by increasing the number of OFDM symbols to which the CSI-RS for BM is mapped. For example, CSI-RS resources for time tracking may be configured by adding CSI-RS REs to low-density CSI-RS REs in the frequency domain, whereas CSI-RS resources for frequency tracking may be configured by adding CSI-RS REs to low-density CSI-RS REs in the time domain.

In the case where the network/gNB periodically transmits the TFRS and beams of the network/gNB have a hierarchical structure using an SS block and a CSI-RS as described above, if the network/gNB indicates association between the TFRS and the SS block, the complexity of BM and time and frequency tracking of the UE may be decreased, and the UE may use path profile information about each beam as an optimization parameter for subsequent channel estimation or MIMO detection of a UE receiver.

The gNB allocates the periodic CSI-RS for BM and the TFRS at the same time by an RRC message. When the two CSI-RSs coincide with each other in their transmission timings, the gNB transmits the TFRS and uses the TFRS for BM. That is, the gNB allocates the periodic CSI-RS for tracking. When the transmission timings of the periodic CSI-RS for BM and the CSI-RS for tracking are identical, the gNB transmits the high-density CSI-RS for tracking and uses the high-density CSI-RS for tracking at once as the TFRS and the CSI-RS for BM. The high-density CSI-RS for tracking may be configured to include the low-density CSI-RS for BM and the additional CSI-RS.

The gNB may configure time-frequency resources for a periodic CSI-RS by an RRC message, indicating a low-density periodicity (i.e., the periodicity of a low-density periodic CSI-RS) and a high-density periodicity (i.e., the periodicity of a high-density periodic CSI-RS) for the same resources (i.e., the same OFDM symbols and frequency band). When the low-density periodic CSI-RS and the high-density periodic CSI-RS are identical in their transmission timings, the gNB may transmit the high-density periodic CSI-RS.

The gNB configures time-frequency resources for a periodic CSI-RS by an RRC message, and basically transmits a low-density CSI-RS for BM in the time-frequency resources. As illustrated in FIG. 15, the gNB may indicate transmission of a high-density CSI-RS at a TFRS transmission timing, dynamically by a physical signal or a physical message such as DCI. Referring to FIG. 15, the DCI may include an indication indicating the transmission position of the high-density CSI-RS (e.g., the position of an OFDM symbol carrying the additional CSI-RS) and resource information (e.g., the RE density of the high-density CSI-RS, a bandwidth carrying the high-density CSI-RS, and so on).

Because the TFRS is transmitted in a beam-wise manner, the gNB may transmit the TFRS of each beam over a few slots, in a localized manner (i.e., TFRS transmission within a short time) in each slot by beam sweeping, for efficient resource utilization and efficient gNB scheduling. That is, the gNB may transmit the TFRS of each beam by changing Tx beam directions one after another in a slot. In this case, data or a control channel may not be transmitted as is done in a normal slot, in a slot in which the gNB performs beam sweeping. Therefore, the gNB preferably transmits DL data or a DL control channel of a short slot length in the form of a mini slot or a channel requiring beam diversity in a slot in which the gNB performs beam sweeping. To allow the UE to receive the channel of a short slot length or the channel requiring beam diversity, the gNB should transmit a DMRS. The TFRS may be used as the DMRS because the TFRS has a similar density to a density in frequency required for the DMRS. However, to enable the UE to obtain a path profile through the TFRS, the same precoding should be applied to all RBs carrying the TFRS. Therefore, the channel transmitted in the slot of a short slot length (i.e., the slot carrying the TFRS in one beam direction) may be transmitted in a time diversity scheme such as space frequency block coding (SFBC) or with the same precoding across a total band. When the gNB intends to use precoding on a subband basis, the gNB may transmit the TFRS and a corresponding data channel by indicating the index of a precoding matrix applied to the data channel by DCI, without applying precoding to the TFRS, similarly to a transmission scheme using the LTE CRS.

Further, when the gNB indicates a beam index and beam connection information (i.e., beam association information) for CSI-RS (time-frequency) resources, the UE may obtain path profile information for each beam by using the beam index and the connection information and use the path profile information for each beam as an optimization parameter for subsequent channel estimation or MIMO detection of the UE receiver.

Method 2-2) Aperiodic TFRS in Area Other than SS Block Duration

FIG. 16 illustrates another example of multiplexing a TFRS with an SS block according to the present disclosure.

In the multi-beam environment, the TFRS should be transmitted on each beam. Therefore, periodic transmission of the TFRS imposes a constraint on a scheduling process of the gNB, or beam sweeping for TFRS transmission in one slot at the gNB results in limitations in resource use. To avoid these problems, an aperiodic TFRS may be defined.

From the perspective of a resource allocation scheme, that is, from the perspective of resources to be used for time/frequency tracking, the PDSCH DMRS may also be used as the aperiodic TFRS. However, when the PDSCH is transmitted in a narrow bandwidth, the purpose that the TFRS is intended to serve may not be achieved and it is difficult for other UEs to use the PDSCH DMRS. Accordingly, the PDSCH DMRS is not suitable as the aperiodic TFRS. The aperiodic CSI-RS for BM is also similar to the PDSCH DMRS in that the CSI-RS for BM is aperiodic and it is difficult to allocate the CSI-RS for BM to a wideband. However, because the TFRS is intended to enable UE(s) to obtain the path profile of a channel, for time tracking, a signal having a low density in frequency such as the aperiodic CSI-RS for BM may not be viable for time tracking. In this context, the present disclosure proposes that the aperiodic CSI-RS for BMS is transmitted with an increased frequency density, for use as the TFRS. Although a high density basically refers to a density on the frequency axis, the high density may also mean an increased density on the time axis or an increased number of (OFDM) symbols carrying a CSI-RS, to enable a UE to use the CSI-RS for frequency tracking.

Referring to FIG. 16, when the gNB transmits a CSI-RS aperiodically to the UE, the aperiodic CSI-RS may be generally indicated by DCI. The DCI may indicate the density of the aperiodic CSI-RS as well as transmission of the aperiodic CSI-RS, so that the UE may use the aperiodic CSI-RS for BM as the TFRS. For example, referring to FIG. 16, the gNB may indicate whether the aperiodic CSI-RS has a low density or a high density in a time-frequency resource area of a specific size. In another method, the gNB may pre-indicate information about a slot in which the TFRS may be transmitted to the UE by an RRC message or the like. When the transmission timing of the aperiodic CSI-RS is a slot preconfigured by the RRC message or the like, the gNB transmits the aperiodic CSI-RS as the TFRS, that is, the high-density CSI-RS in the slot, and the UE performs measurement for fine time and frequency tracking along with measurement for BM or CSI feedback, determining that the TFRS (i.e., the high-density CSI-RS) is transmitted in the slot.

If the gNB indicates the beam index and beam connection information of the CSI-RS resources to the UE, the UE may obtain path profile information for each beam by using the beam index and connection information and use the path profile information for each beam as an optimization parameter for subsequent channel estimation or MIMO detection of the UE receiver. Further, when the TFRS and data or a control channel are transmitted in a specific slot, the TFRS may be used as the DMRS as in the case of periodic TFRS transmission, or may be used to support the DMRS (i.e., used as an additional DMRS for an existing DMRS). That is, like the periodic TFRS described in Method 2-1, the aperiodic TFRS may also be used as the DMRS for a control or data channel.

<Method 3: Transmission of TRS Through SS/PBCH Measurement Timing Configuration (SMTC) for SS/PBCH Block in Unlicensed Band (U-Band)>

In the embodiments of Method 1 and Method 2, TRS transmission has been described above, mainly in the context of a situation in which a gNB may always transmit the TRS in a slot predetermined for transmission in a licensed band or a slot determined by dynamic scheduling.

However, the assumptions taken for the embodiments of Method 1 and Method 2 may not be valid to an unlicensed band according to the transmission state of another system, a gNB, or a UE in a current slot. Therefore, a description will be given of a method of transmitting a TRS in an unlicensed band according to the present disclosure.

In the 3GPP NR system, there is no common RS of which the transmission in each subframe is guaranteed, like the legacy LTE CRS. Therefore, a high-speed UE or a low-cost UE may have difficulty in maintaining DL time-frequency synchronization.

To overcome the problem, the NR system has introduced the TRS. The TRS is an RS identical to the TFRS of Method 1 and Method 2 of the present disclosure, also referred to as the CSI-RS for tracking.

Figure 17:
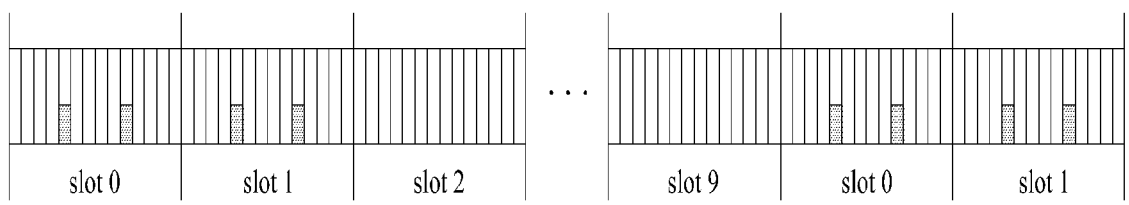
FIG. 17 is a diagram illustrating TRS transmission resources according to an embodiment of the present disclosure.

As illustrated in FIG. 17, the TRS is located in two symbols spaced from each other by four symbols in a slot. Such two consecutive slots carry the TRS, and thus the TRS is transmitted in a total of four symbols. The UE may maintain DL time-frequency synchronization by using the TRS.

Specifically, transmission or non-transmission of the TRS, the transmission slot periodicity of the TRS, and a slot offset may be configured by the RRC, and the symbol indexes of two symbols in each slot may be set to one of {4, 8}, {5, 9}, and {6, 10}. Each slot incudes 14 symbols, and the first symbol of the slot is indexed as index 0. Further, four TRS symbols in two consecutive slots or TRS symbols in consecutive slots may be referred to as a TRS set.

FIG. 17 illustrates an exemplary transmission of a TRS set in symbols with symbol indexes {5, 9} in slots 0 and 1 with a periodicity of 10 slots. In FIG. 17, the TRS is transmitted in shaded symbols 5 and 9. Partial shading of one symbol may indicate that the TRS is transmitted not in all REs or subcarriers of the symbol but in some REs or subcarriers of the symbol.

The gNB may perform a DL transmission in an unlicensed band only after acquiring a channel by a clear channel assessment (CCA) operation such as listen before talk (LBT). Therefore, even though a TRS transmission is configured by a specific slot offset, a slot periodicity, and a symbol index, the configured TRS may not be transmitted partially or fully according to the transmission starting time of a DL Tx burst from the gNB based on LBT. The DL Tx burst may refer to a set of DL signals that the gNB transmits to the UE during a predetermined period based on LBT.

Because the TRS is generally helpful for DL synchronization acquisition of the UE only when it is transmitted in one or more symbols spaced from each other by a predetermined interval or larger, transmission of the TRS only in a part of symbols scheduled for the TRS may not be useful for the UE. Additionally, when the UE has no accurate knowledge of transmission or non-transmission of the TRS and thus estimates a time/frequency offset or a Doppler spread, determining that the TRS is transmitted in a slot actually carrying no TRS, the performance of the UE may be significantly degraded. Therefore, there is a need for accurately transmitting, to the UE, information indicating whether the TRS is transmitted and information about the transmission format of the TRS in a current slot or a scheduled slot. Accordingly, methods of transmitting information indicating whether a TRS is transmitted and information related to the transmission format of the TRS to a UE according to the present disclosure will be described below.

Before describing embodiments of the present disclosure, operations of a UE and a BS according to embodiments of the present disclosure will be described briefly.

Figure 18:
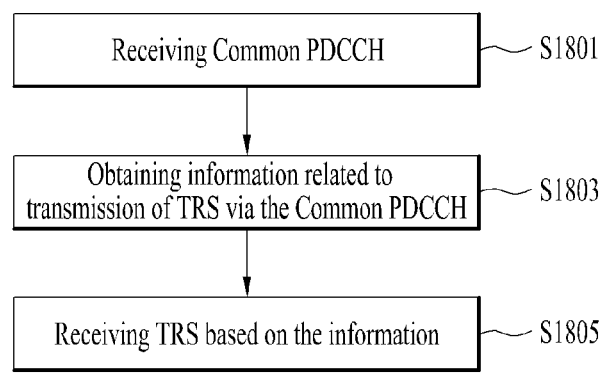
FIGS. 18, 19 and 20 are diagrams illustrating operations of a user equipment (UE) and a base station (BS) according to an embodiment of the present disclosure.

FIG. 18 is a flowchart illustrating an operation of a UE according to an embodiment of the present disclosure. Referring to FIG. 18, the UE receives a common PDCCH related to information indicating whether a TRS is transmitted from the BS and the transmission format of the TRS (S1801). The UE acquires the information indicating whether the TRS is transmitted and the transmission format of the TRS from the received common PDCCH (S1803) and receives the TRS based on the information (S1805). The information related to transmission or non-transmission of the TRS and the information related to the transmission format of the TRS may be transmitted and received according to Method 3-1 and Method 3-2 described below in steps S1801 to S1805. Further, the UE may receive additional information from the BS according to Method 3-1 and Method 3-2 after step S1803. For example, the UE may receive specific information related to transmission or non-transmission of the TRS by a UE scheduling PDCCH signal according to Method 3-2. This operation will be described in detail with reference to Method 3-1 and Method 3-2.

Figure 19:
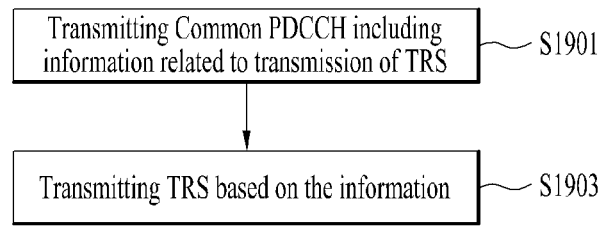

With reference to FIG. 19, an operation of a BS according to an embodiment of the present disclosure will be described. Referring to FIG. 19, the BS transmits, to a UE, information related to transmission or non-transmission of a TRS and information related to the transmission format of the TRS on a common PDCCH (S1901). Subsequently, the BS transmits the TRS to the UE based on the information related to transmission or non-transmission of the TRS and the information related to the transmission format of the TRS included in the common PDCCH (S1903).

The information related to transmission or non-transmission of the TRS and the information related to the transmission format of the TRS may be transmitted and received according to Method 3-1 and Method 3-2 described below in steps S1901 and S1903. Further, the BS may transmit additional information according to Method 3-1 and Method 3-2 after step S1901. For example, the BS may transmit specific information related to transmission or non-transmission of the TRS to the UE by a UE scheduling PDCCH signal according to Method 3-2. This operation will be described in detail with reference to Method 3-1 and Method 3-2.

Figure 20:
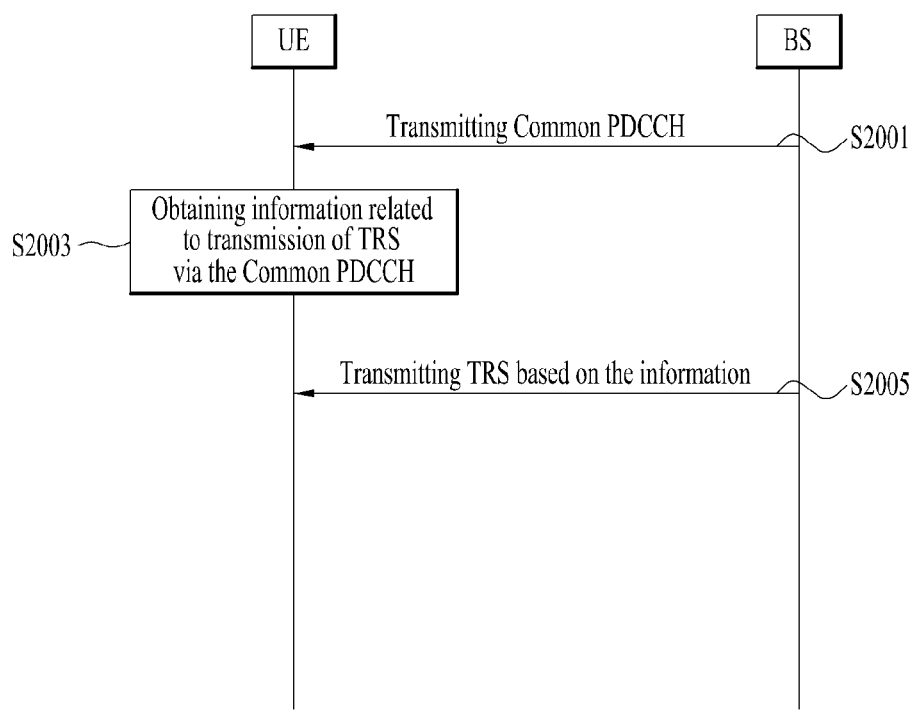

With reference to FIG. 20, an operation of a network according to an embodiment of the present disclosure will be described.

Referring to FIG. 20, a BS transmits, to a UE, information related to transmission or non-transmission of a TRS and information related to the transmission format of the TRS on a common PDCCH (S2001). Upon receipt of the common PDCCH, the UE acquires the information related to transmission or non-transmission of the TRS and the information related to the transmission format of the TRS from the received common PDCCH (S2003) and receives the TRS based on the information (S2005). The information related to transmission or non-transmission of the TRS and the information related to the transmission format of the TRS may be transmitted and received according to Method 3-1 and Method 3-2 described below in steps S2001 to S2005. Further, the UE may receive additional information from the BS according to Method 3-1 and Method 3-2 after step S2003. For example, the UE may receive specific information related to transmission or non-transmission of the TRS from the BS by a UE scheduling PDCCH signal according to Method 3-2. This operation will be described in detail with reference to Method 3-1 and Method 3-2.

Method 3-1) Method of Signaling Transmission or Non-Transmission of a TRS and the Transmission Format of the TRS on a Common PDCCH Transmitted Along with a DL Tx Burst by a BS.

When the BS transmits a DL Tx burst, the BS may also transmit a common PDCCH receivable at a plurality of UEs belonging to the BS in order to signal the format of a slot for the DL Tx burst (e.g., a DL slot, a UL slot, the number of symbols per slot, and so on) and the length of the DL Tx burst to the UE. The format of the slot may include information indicating whether the slot for the DL burst is a DL slot or a UL slot and information about the number of symbols per slot. Further, the format of the slot may also include information indicating whether each symbol of the slot is a DL symbol or a UL symbol. Further, the common PDCCH may be a group-common PDCCH.

In other words, the BS may transmit information indicating whether the TRS is transmitted in the DL Tx burst and information about the transmission format of the TRS by the common PDCCH. The information about the transmission format of the TRS may include the slot number of a slot carrying the TRS, a slot offset, and a slot periodicity, and may include information about symbols and REs carrying the TRS in each slot.

Method 3-2) Method of Indicating Whether a TRS is Transmitted in a Specific Slot/Symbol by a Common PDCCH or a DL Scheduling PDCCH by a BS.

When transmission or non-transmission of the TRS in a specific slot depends on an LBT result of the BS as described before, the BS may indicate whether the TRS is transmitted in the specific slot/symbol by a common PDCCH or a DL scheduling PDCCH. In addition, the BS may also indicate whether it is assumed that data or another signal is not mapped to REs available for TRS transmission in the specific slot/symbol.

Alternatively, the BS may indicate whether the TRS is transmitted or whether any other signal is not mapped by the common PDCCH and may indicate again whether the TRS is transmitted by a DL scheduling PDCCH.

This method is useful in transmitting the TRS in a DL Tx burst and allowing the TRS to be referred to in relation to a DL signal and data on a specific DL Tx beam.

Herein, the DL scheduling PDCCH may indicate a Tx beam carrying the TRS as well as whether the TRS is transmitted. Alternatively, the BS may indicate another DL signal which may be assumed to be quasi-collocated with the TRS to the UE. Alternatively, information about a Tx beam carrying the TRS in the DL Tx burst or information about another DL signal which may be assumed to be quasi-collocated with the TRS may be included in the common PDCCH.

Further, simultaneously with indicating that a DL Tx burst is transmitted, the BS may indicate to the UE receiving the DL Tx burst to perform an operation of measuring a time/frequency offset, a Doppler spread, and so on based on the TRS immediately before or simultaneously with data reception, and correct them, when needed.

This implies that the TRS may be used as an initialization signal for the DL Tx burst. The initialization signal may refer to a signal that may indicate the start of a specific signal having a predetermined unit/length/area such as a DL Tx burst.

In this case, the TRS may use a different transmission format from that of a broadcast TRS, to serve the purpose of an initialization signal. For example, a format may be defined, in which the TRS is transmitted in the first and second symbols of a DL Tx burst, for time and frequency tracking, and in some slots of the same slot or the next slot, for Doppler spread and fine frequency offset measurement. The TRS transmitted in the first and second symbols, for time and frequency tracking may also be used as the PDCCH DMRS.

In this case, the BS may transmit the TRS at the start of the traffic burst for the UE, so that the UE may perform an optimized operation for receiving the traffic burst, before data reception. For example, the BS may transmit the TRS at the start of the traffic burst to help the UE to perform fine time tracking, fine frequency offset measurement and compensation, Doppler spread estimation, coherent bandwidth estimation, and so on before data reception.

Further, for this purpose, the BS needs to indicate information related to transmission or non-transmission of the TRS along with the DL Tx burst and information related to the transmission format of the TRS to the UE by a DL scheduling PDCCH. Upon receipt of the information, the UE may determine whether the TRS is transmitted and perform a measurement operation using the TRS.

In addition, because the TRS transmitted in the above method may be used by other UEs as described before, the BS may indicate information related to transmission or non-transmission of the TRS, the transmission format of the TRS, and information related to a QCLed DL signal by a common PDCCH, so that other UEs may use the information.

Method 3-2 will be described in detail with reference to FIG. 21. The UE may primarily determine whether a DL Tx burst is transmitted by a process of detecting a TRS symbol allocated at the start of a slot. In this case, a sequence of the TRS may be configured based on a cell ID/beam ID or initialized by a UE ID.

The UE may estimate the accurate reception timing of the slot by the TRS symbol allocated at the start of the slot. Further, when two starting symbols of the slot are configured as TRS symbols, a frequency offset may be measured using the TRS symbols.

If three or more TRS symbols are configured, correlations of symbol combinations each including two TRS symbols (e.g., set1={#1-#7}, set2={#7-#14}, and set3 {#1-#14} in Ex2. Of FIG. 21) may be measured and combined, thereby estimating a Doppler spread. For example, the Doppler spread may be estimated by combining the correlations of set 1 and set 3 in Ex. 2 of FIG. 21.

Figure 22:
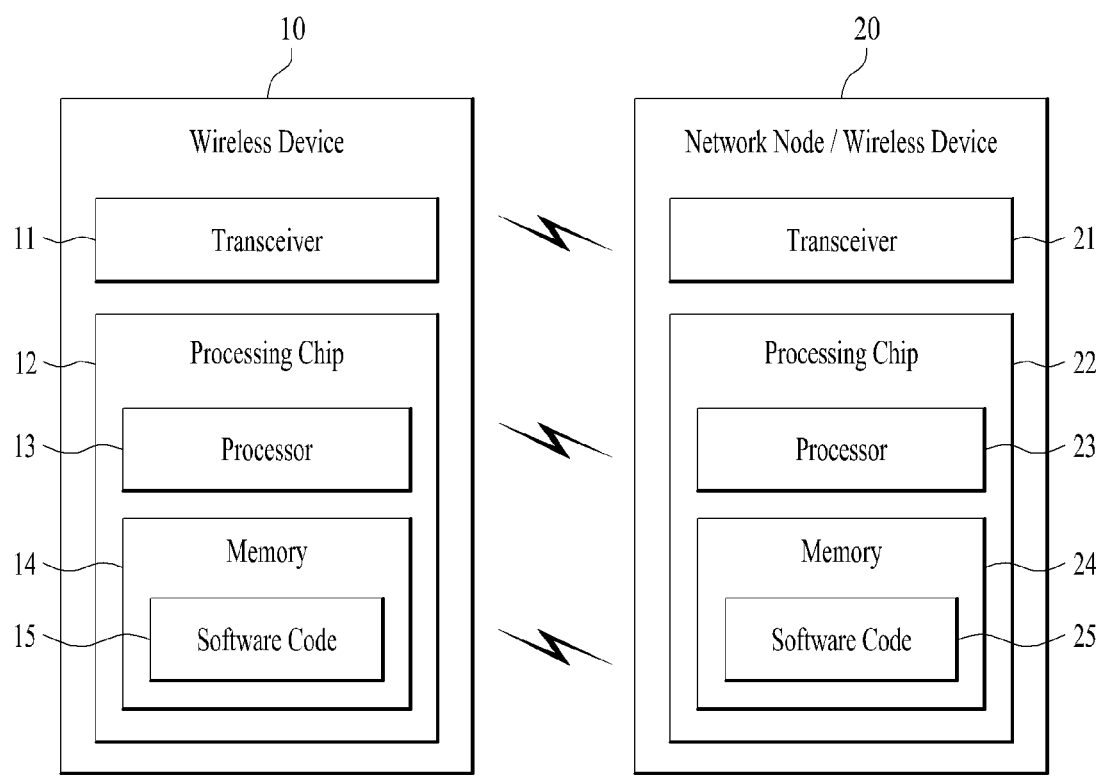
FIG. 22 is a block diagram illustrating the components of wireless devices for implementing the present disclosure.

FIG. 22 is a block diagram illustrating communication between a wireless device 10 and a network node 20. In FIG. 22, the network node 20 may be replaced with a wireless device or a UE.

In the present specification, the wireless device 10 or the network node 20 may include a transceiver 11 or 21 configured to communicate with one or more other wireless devices, network nodes, and/or other entities in the network. The transceiver 11 or 21 may include one or more transmitters, one or more receivers, and/or one or more communications interfaces.

The transceiver 11 or 21 may include one or more antennas. The antenna may be configured to transmit a signal processed by the transmitter 11 or 21 to the outside under the control of a processing chip 12 or 22 or deliver a radio signal received from the outside to the processing chip 12 or 22. The antenna may be referred to as an antenna port. Each antenna may correspond to one physical antenna or be configured by a combination of two or more physical antenna elements. A signal transmitted on each antenna may not be decomposed further at the wireless device 10 or the network node 20. An RS transmitted in relation to a corresponding antenna defines an antenna observed from the perspective of the wireless device 10 or the network node 20. Thus, the RS may allow the wireless device 10 or the network node 20 to estimate a channel for the antenna regardless of whether the channel is a single radio channel from one physical antenna or a composite channel from a plurality of physical antenna elements including the antenna. That is, an antenna is defined such that a channel for carrying a symbol on the antenna is derived from a channel for carrying another symbol on the same antenna. When a transceiver supports multi-input multi-output (MIMO) functionality capable of transmitting and receiving data on a plurality of antennas, the transceiver may be connected to two or more antennas.

In the present disclosure, the transceiver 11 or 21 may be configured to support reception beamforming and transmission beamforming. For example, the transceiver 11 or 21 may be configured to perform the functions illustrated above with reference to FIGS. 7 to 9.

The wireless device 10 or the network node 20 may include the processor chip 12 or 22. The processor chip 12 or 22 may include at least one processor such as a processor 13 or 23 and at least one memory device such as a memory 14 or 24.

The processing chip 12 or 22 may be configured to control at least one of the methods and/or processes described in the present specification. In other words, the processor chip 12 or 22 may be configured to implement at least one of the embodiments disclosed in the present specification.

The processor 13 or 23 may include at least one processor configured to execute the functions of the wireless device 10 or the network node 20 described above in the present specification.

For example, the at least one process may be configured to control the transceiver 11 or 21 in FIG. 22 to transmit and receive information.

The processor 13 or 23 included in the processing chip 12 or 22 may be configured to apply predetermined coding and modulation to a signal and/or data to be transmitted to the outside of the wireless device 10 or the network node 20 and transmit the signal and/or data to the transceiver 11 or 21. For example, the processor 13 or 23 may be configured to convert a data sequence to be transmitted into K layers through demultiplexing, channel coding, scrambling, and modulation. The encoded data sequence may be referred to as a codeword and be equivalent to a transport block, i.e., a data block provided by the MAC layer. One transport block (TB) is encoded as one codeword, and each codeword is transmitted to a receiver in the form of one or more layers. For frequency-up conversion, the transceiver 11 or 21 may include an oscillator. The transceiver 11 or 21 may include $N_t$ transmit antennas (where $N_t$ is a positive integer greater than or equal to 1).

The processing chip 12 or 22 may include the memory 14 or 24 configured to store data, programmable software code, and/or other information for implementing the embodiments described in the present specification.

In other words, the memory 14 or 24 may be configured to store software code 15 or 25 including commands for allowing the processor 13 or 23 to perform some or all of the processes controlled by the processor 13 or 23 in FIG. 22 or implementing the embodiments described above with reference to FIGS. 1 to 21 when being executed by the at least one processor such as the processor 13 or 23.

Specifically, the processing chip 12 of the wireless device 10 according to an embodiment of the present disclosure controls the transceiver 11 to receive a common PDCCH including information related to transmission or non-transmission of a TRS and the transmission format of the TRS. Subsequently, the processing chip 12 acquires the information related to transmission or non-transmission of the TRS and the transmission format of the TRS from the received common PDCCH and controls the transceiver 11 to receive the TRS based on the information. The information related to transmission or non-transmission of the TRS and the transmission format of the TRS may be transmitted and received according to the afore-described Method 3-1 and Method 3-2. Further, the processing chip 12 may receive additional information from the BS according to the afore-described Method 3-1 and Method 3-2, when needed. For example, the UE may receive specific information related to transmission or non-transmission of the TRS by a UE scheduling PDCC signal. A specific embodiment of this operation is based on the afore-described Method 3-1 and Method 3-2.

Further, the processing chip 22 of the network node 20 according to an embodiment of the present disclosure controls the transceiver 21 to transmit a common PDCCH including the information related to transmission or non-transmission of a TRS and the transmission format of the TRS to the UE. Then, the processing chip 22 controls the transceiver 21 to transmit the TRS to the UE based on the information related to transmission or non-transmission of a TRS and the transmission format of the TRS included in the common PDC CH.

The processing chip 22 may perform transmission/reception of the information related to transmission or non-transmission of the TRS and the transmission format of the TRS according to the afore-described Method 3-1 and Method 3-2. Further, the processing chip 22 may transmit additional information according to the afore-described Method 3-1 and Method 3-2, when needed. For example, the processing chip 22 may transmit specific information related to transmission or non-transmission of the TRS by a UE scheduling PDCC signal. A specific embodiment of this operation is based on the afore-described Method 3-1 and Method 3-2.

The above-described embodiments are combinations of elements and features of the present disclosure in prescribed forms. The elements or features may be considered as selective unless specified otherwise. Each element or feature may be implemented without being combined with other elements or features. Further, the embodiment of the present disclosure may be constructed by combining some of the elements and/or features. The order of the operations described in the embodiments of the present disclosure may be modified. Some configurations or features of any one embodiment may be included in another embodiment or replaced with corresponding configurations or features of the other embodiment. It is obvious to those skilled in the art that claims that are not explicitly cited in each other in the appended claims may be presented in combination as an embodiment of the present disclosure or included as a new claim by a subsequent amendment after the application is filed.

In this document, a specific operation described as performed by the BS may be performed by an upper node of the BS. That is, it is apparent that various operations for communication with the UE may be performed by the BS or other network nodes rather than the BS in a network including a plurality of network nodes including the BS. The term 'base station' may be replaced with the term 'fixed station', 'Node B', 'eNode B (eNB)', 'access point (AP)', etc.

The embodiments of the present disclosure may be achieved by various means, for example, hardware, firmware, software, or any combination thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method and apparatus of transmitting and receiving an RS in an unlicensed band have been described above in the context of a 5G NewRAT system, they are also applicable to various wireless communication systems other than the 5G NewRAT system.

The invention claimed is:

1. A method of receiving a tracking reference signal (TRS) in an unlicensed band by a user equipment (UE), the method comprising:
receiving a common physical downlink control channel (PDCCH) including first information related to transmission of the TRS; and
receiving the TRS based on the first information,
wherein the first information includes (i) at least one of information about transmission or non-transmission of the TRS or information about a transmission format of the TRS and (ii) information related to whether a signal other than the TRS is mapped in a slot carrying the TRS, and
wherein the TRS is mapped to first and second symbols of the slot carrying the TRS.

2. The method according to claim 1, wherein the common PDCCH is transmitted together with a downlink transmission burst.

3. The method according to claim 1, wherein the transmission format of the TRS relates to a slot and a symbol carrying the TRS.

4. The method according to claim 1, wherein, based on the TRS being transmitted in a first symbol of a downlink transmission burst, the TRS is used as a demodulation reference signal (DMRS) for a PDCCH.

5. The method according to claim 1, further comprising receiving a downlink scheduling PDCCH including at least one of second information about a beam carrying the TRS or third information about a downlink signal assumable to be quasi-collocated with the TRS.

6. The method according to claim 1, wherein a sequence of the TRS is based on at least of a cell identifier (ID), a beam ID, or a UE ID.

7. The method according to claim 1, wherein the common PDCCH is a group-common PDCCH.

8. A communication device for receiving a tracking reference signal (TRS) in an unlicensed band, the communication device comprising:
a memory; and
a processor coupled to the memory,
wherein the processor is configured to control to:
receive a common physical downlink control channel (PDCCH) including information related to transmission of the TRS, and
receive the TRS based on the information related to transmission of the TRS, and
wherein the information related to transmission of the TRS includes (i) at least one of information about transmission or non-transmission of the TRS or information about a transmission format of the TRS and (ii) information related to whether a signal other than the TRS is mapped in a slot carrying the TRS, and
wherein the TRS is mapped to first and second symbols of the slot carrying the TRS.

9. A method of transmitting a tracking reference signal (TRS) in an unlicensed band by a base station (BS), the method comprising:
transmitting a common physical downlink control channel (PDCCH) including information related to transmission of the TRS; and
transmitting the TRS based on the information related to transmission of the TRS,
wherein the information related to transmission of the TRS includes (i) at least one of information about transmission or non-transmission of the TRS or information about a transmission format of the TRS and (ii) information related to whether a signal other than the TRS is mapped in a slot carrying the TRS, and
wherein the TRS is mapped to first and second symbols of the slot carrying the TRS.

* * * * *